(12) United States Patent
Koinuma

(10) Patent No.: US 11,506,246 B2
(45) Date of Patent: Nov. 22, 2022

(54) POWER TRANSMISSION DEVICE

(71) Applicant: Hitachi Construction Machinery Co., Ltd., Tokyo (JP)

(72) Inventor: Takuma Koinuma, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 17/427,181

(22) PCT Filed: Apr. 22, 2019

(86) PCT No.: PCT/JP2019/017056
§ 371 (c)(1),
(2) Date: Jul. 30, 2021

(87) PCT Pub. No.: WO2020/217280
PCT Pub. Date: Oct. 29, 2020

(65) Prior Publication Data
US 2022/0128100 A1 Apr. 28, 2022

(51) Int. Cl.
*F16D 23/06* (2006.01)

(52) U.S. Cl.
CPC ...... *F16D 23/06* (2013.01); *F16D 2023/0643* (2013.01); *F16D 2023/0662* (2013.01); *F16D 2023/0668* (2013.01)

(58) Field of Classification Search
CPC ............. F16D 23/06; F16D 2023/0662; F16D 2023/0668; F16D 2023/0643
See application file for complete search history.

(56) References Cited

U.S. PATENT DOCUMENTS 3,048,247 A * 8/1962 Cook .................. F16D 25/0638
192/53.32
3,063,529 A * 11/1962 Cook ..................... F16D 23/06
192/53.5

(Continued)

FOREIGN PATENT DOCUMENTS

DE 10 2012 215 773 A1 3/2014
DE 10 2013 216 657 A1 2/2015

(Continued)

OTHER PUBLICATIONS

International Search Report (PCT/ISA/210) issued in PCT Application No. PCT/JP2019/017056 dated Jun. 25, 2019 with English translation (five (5) pages).

(Continued)

*Primary Examiner* — David R Morris
(74) *Attorney, Agent, or Firm* — Crowell & Moring LLP

(57) ABSTRACT

A first rotating shaft (22) and a second rotating shaft (43) are connected so as to be capable of transmitting rotation by engagement of a first pawl portion (38) of a piston (32) and a second pawl portion (47) of the second rotating shaft (43) based upon delivery of hydraulic oil to an oil chamber (37). The first pawl portion, when in engagement with the second pawl portion based upon the delivery of the hydraulic oil, is engaged with a third pawl portion (52) of a synchronizer ring (51) prior to the engagement with the second pawl portion. Engagement surfaces of the first and second pawl portions are formed as inclination surfaces so that a force is applied to the first pawl portion and the second pawl portion in a direction of axially moving away from each other when the rotation is transmitted between the first and second rotating shafts.

7 Claims, 18 Drawing Sheets

(56) References Cited

U.S. PATENT DOCUMENTS

| | | | |
|---|---|---|---|
| 5,377,800 A | | 1/1995 | Sperduti et al. |
| 2005/0199466 A1 | | 9/2005 | Miyamoto et al. |
| 2007/0295575 A1 | * | 12/2007 | Turner .................... F16D 23/04 |
| | | | 192/85.21 |
| 2012/0247913 A1 | * | 10/2012 | Nakano ............... F16D 25/0638 |
| | | | 192/18 A |
| 2018/0245641 A1 | * | 8/2018 | Yoshida .................. F16D 23/06 |

FOREIGN PATENT DOCUMENTS

| | | |
|---|---|---|
| JP | 3-91531 U | 9/1991 |
| JP | 4-62926 U | 5/1992 |
| JP | 8-145075 A | 6/1996 |
| JP | 2000-329159 A | 11/2000 |
| JP | 2005-291490 A | 10/2005 |
| JP | 2008-64228 A | 3/2008 |

OTHER PUBLICATIONS

Japanese-language Written Opinion (PCT/ISA/237) issued in PCT Application No. PCT/JP2019/017056 dated Jun. 25, 2019 (four (4) pages).

* cited by examiner

POWER TRANSMISSION DEVICE

TECHNICAL FIELD

The present invention relates to a power transmission device mounted on a working vehicle of, for example, a wheel loader, a hydraulic excavator or the like.

BACKGROUND ART

For example, a working vehicle such as a wheel loader, a hydraulic excavator or the like, is provided thereon with a power transmission device (clutch device) that is disposed in the halfway of a power transmission path to switch between transmission and cutoff (release) of power. The power transmission device is configured to be capable of switching between "connection state (joint state)" where transmission of rotation (torque, rotating forces and power) is performed between a pair of rotating members which are arranged coaxially and can perform relative rotation to each other and "cutoff state (release state)" where the transmission of the rotation therebetween is cut off.

Here, in a case of adopting the structure (friction clutch) of performing transmission of the power by frictional connection of friction plates as the power transmission device, the power transmission device is excellent in synchronization performance at the frictional connection of the friction plates. For an increase on the transmission torque, however, it is necessary to use large-diameter friction plates or increase the number of the friction plates. As a result, the power transmission device is sized to be large, which is possibly limited in a space at the mounting on the working vehicle. Further, an area of a sliding part becomes large, which poses a possibility of an increase on heat generation of friction surfaces (sliding surfaces) of the friction plates at the cutoff state (release state). For restriction of the heat generation, it will be considered to cool the friction surfaces by liquids, but there is a possibility that losses caused by the stirring of the liquids between the friction surfaces and losses caused by release of the liquids to the rotational outside by the rotation of the friction plates become large.

On the other hand, in a case of adopting the structure (meshing clutch) of performing the transmission of the power by the engagement of pawl portions as the power transmission device, there is no friction sliding surface at the cutoff state (release state) where the transmission of the rotation is cut off, and therefore, the heat generation caused by the friction (sliding) can be made small. As a result, an amount of cooling liquids can be made small to reduce the loss. However, since this structure has no synchronization performance of rotation at the engagement of the pawl portions, an abrupt variation (surge) of torque may be caused by momentary engagement of two elements different in a rotating speed. On the other hand, Patent Document 1 describes a power transmission device that is configured to, at the time of switching the cutoff state to the connection state, transition from frictional coupling to mechanical coupling. According to the structure of Patent Document 1, at the time of switching the cutoff state to the connection state, a frictional force is generated between annular members all the time rotating integrally with one rotating shaft and the other rotating shaft, by which rotation of the one rotating shaft can be synchronized with that of the other rotating shaft. In a state where the rotation of the one rotating shaft is synchronized with that of the other rotating shaft, the mechanical coupling, that is, the engagement of spline teeth can be performed.

PRIOR ART DOCUMENT

Patent Document

Patent Document 1: U.S. Pat. No. 5,377,800

SUMMARY OF THE INVENTION

The structure of Patent Document 1 has a possibility that at the cutoff state (release state), many sliding parts are generated between the one rotating shaft and the other rotating shaft to increase the heat generation and the loss of the power by the friction (sliding). When the supply amount of cooling liquids is increased for suppressing the heat generation, the loss of the power may be made large also from this point. Further, the structure of Patent Document 1 has a possibility that since the friction surfaces at the synchronization are small, in a case where absorption energy necessary for the synchronization is large, the heat generation becomes large and durability of the friction surfaces deteriorates due to a temperature rise. Furthermore, the structure of Patent Document 1 has a possibility that when large torque is transmitted in the connection state, that is, the large torque is transmitted by the engagement of the spline teeth, the engagement of the spline teeth cannot be released.

An object of the present invention is to provide a power transmission device that can reduce the loss of power and stably release the engagement between one rotating shaft and the other rotating shaft even at the time of transmitting large torque (rotating forces and power) therebetween.

A power transmission device according to the present invention comprises a first rotating shaft, a piston that is disposed in the first rotating shaft in a state where an axial movement relative to the first rotating shaft is made possible and a circumferential movement relative to the first rotating shaft is blocked, and includes a first pawl portion, an oil chamber that is disposed between the first rotating shaft and the piston and to which hydraulic oil is delivered to cause the piston to move in the axial direction of the first rotating shaft, a second rotating shaft that is disposed to be coaxial with the first rotating shaft and to be capable of performing relative rotation to the first rotating shaft, and includes a second pawl portion engageable with the first pawl portion, and a synchronizer ring that is supported on the second rotating shaft to be coaxial with the second rotating shaft, the synchronizer ring including a sliding surface movable in the axial direction and in the circumferential direction relative to the second rotating shaft, and a third pawl portion engageable with the first pawl portion, wherein the first rotating shaft and the second rotating shaft are connected to be capable of transmitting rotation by the engagement of the first pawl portion of the piston and the second pawl portion of the second rotating shaft based upon the delivery of the hydraulic oil to the oil chamber, the first pawl portion of the piston is, when being engaged with the second pawl portion of the second rotating shaft based upon the delivery of the hydraulic oil to the oil chamber, engaged with the third pawl portion of the synchronizer ring prior to being engaged with the second pawl portion, and engagement surfaces between the first pawl portion and the second pawl portion are formed as inclination surfaces so that a force is applied to the first pawl portion and the second pawl portion in a direction of axially moving away from each other when the rotation is transmitted between the first rotating shaft and the second rotating shaft.

Further, a power transmission device according to the present invention comprises a first rotating shaft, a piston that is disposed in the first rotating shaft in a state where an axial movement relative to the first rotating shaft is made possible and a circumferential movement relative to the first rotating shaft is blocked, and includes a first pawl portion, an oil chamber that is disposed between the first rotating shaft and the piston and to which hydraulic oil is delivered to cause the piston to move in the axial direction of the first rotating shaft, a first rotating shaft-side friction plate that is supported by the piston in a state of being coaxial with the piston and relative rotation to the piston being blocked, a second rotating shaft that is disposed to be coaxial with the first rotating shaft and to be capable of performing relative rotation to the first rotating shaft, and includes a second pawl portion engageable with the first pawl portion, and a second rotating shaft-side friction plate that is supported by the piston in a state of being coaxial with the piston and relative rotation to the second rotating shaft being blocked, wherein the first rotating shaft and the second rotating shaft are connected to be capable of transmitting rotation by the engagement of the first pawl portion of the piston and the second pawl portion of the second rotating shaft based upon the delivery of the hydraulic oil to the oil chamber, the first rotating shaft-side friction makes, when the first pawl portion of the piston is engaged with the second pawl portion of the second rotating shaft based upon the delivery of the hydraulic oil to the oil chamber, frictional contact with the second rotating shaft-side friction plate prior to the engagement of the first pawl portion and the second pawl portion, and engagement surfaces between the first pawl portion and the second pawl portion are formed as inclination surfaces so that a force is applied to the first pawl portion and the second pawl portion in a direction of axially moving away from each other.

According to the present invention, the power transmission device that can reduce the loss of power and stably release the engagement between one rotating shaft and the other rotating shaft even at the time of transmitting the large torque (rotating forces and power) therebetween.

MODE FOR CARRYING OUT THE INVENTION

Hereinafter, a power transmission device according to each of embodiments in the present invention will be in detail explained with reference to the accompanying drawings, by taking a case of being applied to a wheel loader as an example.

Figure 1:
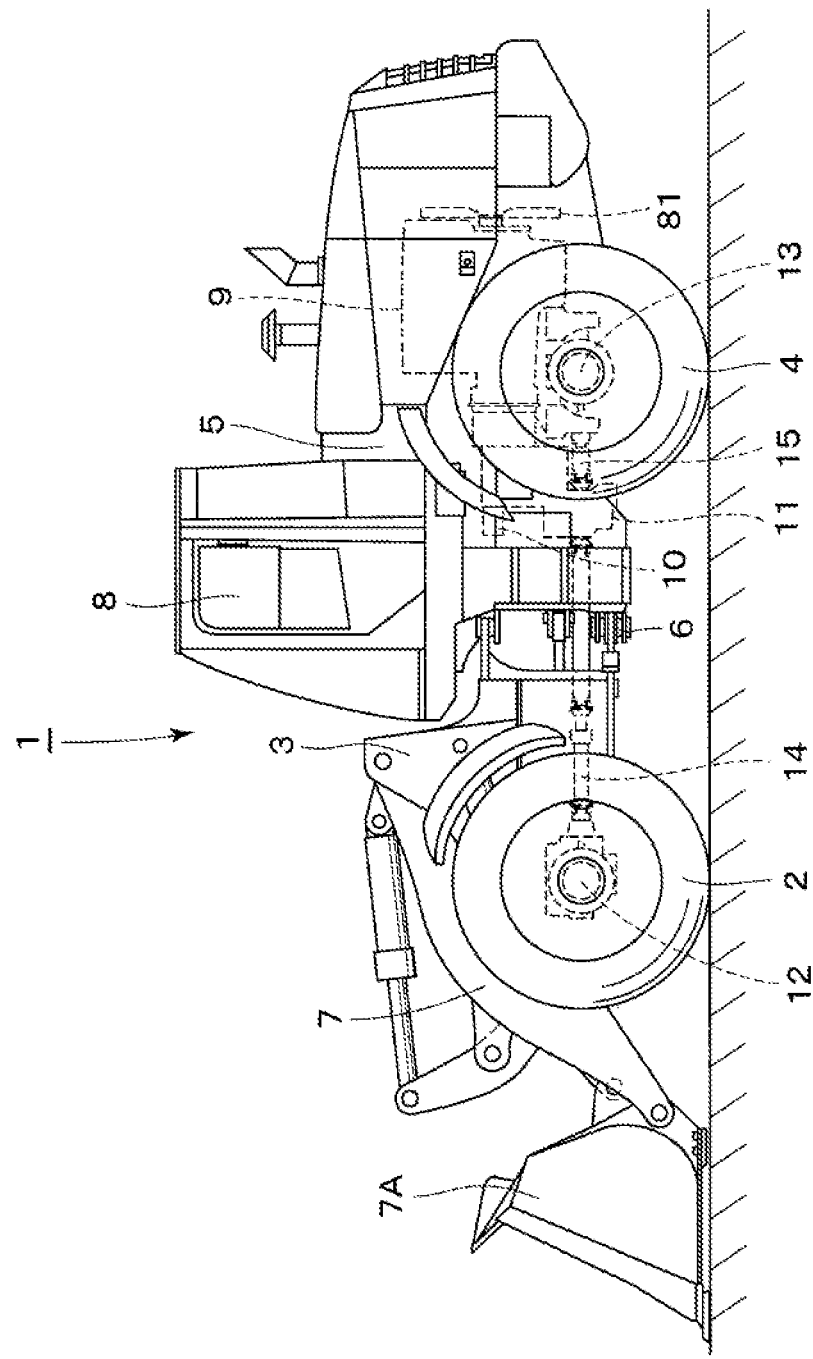
FIG. 1 is a left side view illustrating a wheel loader on which a power transmission device according to a first embodiment is mounted.

FIG. 1 to FIG. 11 illustrate a power transmission device according to a first embodiment of the present invention. In FIG. 1, a wheel loader 1 is a representative example of a working vehicle. The wheel loader 1 is configured as an accumulating type working vehicle in which a front vehicle body 3 provided with left and right front wheels 2 is connected to a rear vehicle body 5 provided with left and right rear wheels 4 to be capable of bending in a left-right direction. That is, the front vehicle body 3 and the rear vehicle body 5 configures a vehicle body of the wheel loader 1. A center hinge 6 and a steering cylinder (unillustrated) are arranged between the front vehicle body 3 and the rear vehicle body 5, and expansion/contraction of the steering cylinder enables the front vehicle body 3 and the rear vehicle body 5 to bend in the left-right direction around the center hinge 6, thus performing the steering of the wheel loader 1 at the traveling.

A working mechanism 7 called also as a cargo handling machine is disposed in the front vehicle body 3 of the wheel loader 1 to be capable of tilting/lifting thereto. The working mechanism 7 is provided with a loader bucket 7A. On the other hand, a cab 8 that defines therein an operating room, an engine 9, a hydraulic pump 10, a speed change gear 11 as a transmission, and the like are arranged in the rear vehicle body 5 of the wheel loader 1. The engine 9 is a power source (prime mover) of the wheel loader 1. The power source (prime mover) can be configured with one unit of the engine 9 as an internal combustion engine, and besides may be configured with, for example, an engine and an electric motor or an electric motor unit. The hydraulic pump 10 is connected to the engine 9. The hydraulic pump 10 is a hydraulic source for operating the working mechanism 7.

A front axle 12 extending in the left-right direction is disposed under the front vehicle body 3. The left and right front wheels 2 are attached in both ends of the front axle 12. On the other hand, a rear axle 13 extending in the left-right direction is disposed under the rear vehicle body 5, and the left and right rear wheels 4 are attached in both ends of the rear axle 13.

The front axle 12 is connected via a front propeller shaft 14 to the speed change gear 11. The rear axle 13 is connected via a rear propeller shaft 15 to the speed change gear 11. The speed change gear 11 includes a speed change mechanism, a torque converter, and an after-mentioned power transmission device 21 (refer to FIG. 3 and the like), for example. The speed change gear 11 reduces rotation of the engine 9 to be transmitted to the front propeller shaft 14 and the rear propeller shaft 15. That is, the power from the engine 9 is transmitted to the speed change gear 11 connected to the engine 9.

Figure 2:
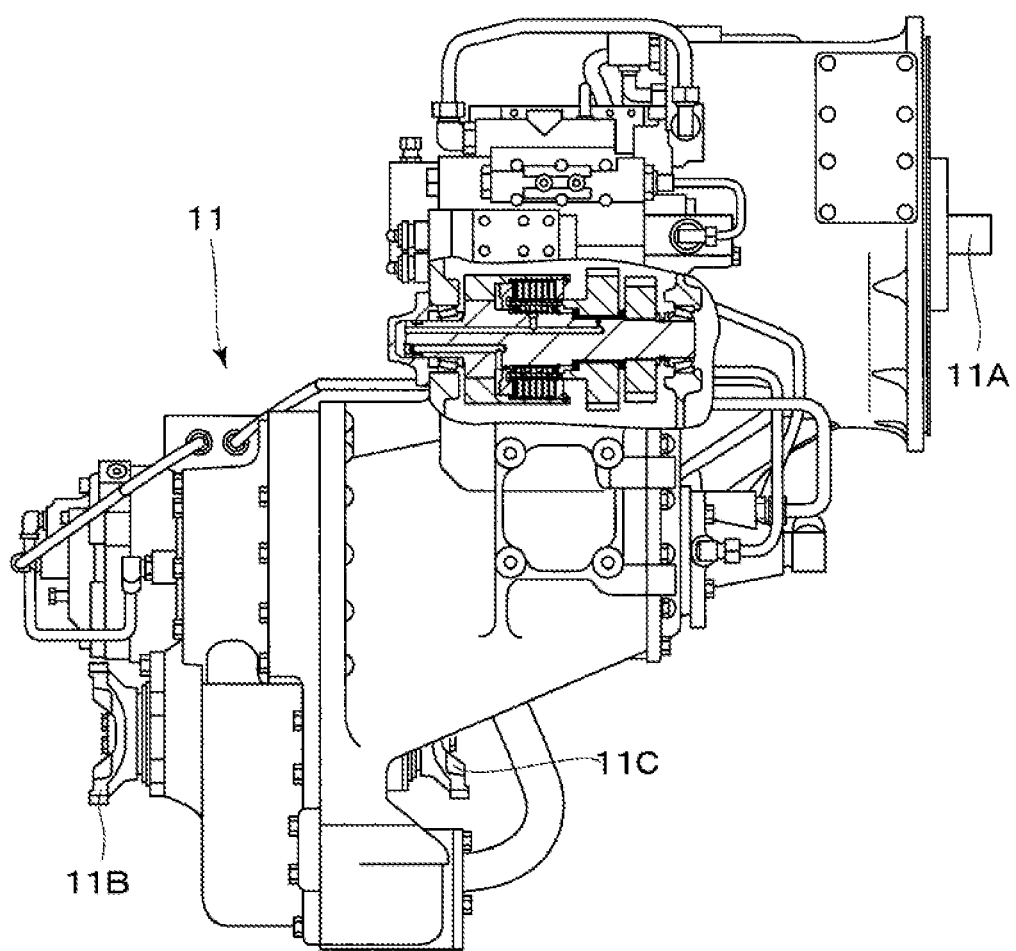
FIG. 2 is a partially broken side view illustrating a speed change gear in FIG. 1.

The power from the engine 9, after a rotating speed and a rotational direction thereof are adjusted by the speed change gear 11, is transmitted from front and rear output shafts 11B, 11C in the speed change gear 11 through the front propeller shaft 14 and the rear propeller shaft 15 to the front axle 12 and the rear axle 13. That is, as illustrated in FIG. 2, the speed change gear 11 is provided with an input shaft 11A connected to the engine 9, a first output shaft 11B connected to the front propeller shaft 14 and a second output shaft 11C connected to the rear propeller shaft 15. The power transmission device 21, which is called also as a clutch device, comprising one or plural ones is disposed in the speed change gear 11. The speed change gear 11 is so configured that the power transmission path in the speed change gear 11 is switched by switching the connection (engagement) and the cutoff (disengagement) of the power transmission device 21 to perform the switching of gearshift and forward rotation/reverse rotation between the input shaft 11A and the output shafts 11B, 11C.

Next, an explanation will be made of the power transmission device 21 according to a first embodiment by referring to FIG. 3 to FIG. 11. The power transmission device 21 according to the first embodiment is disposed inside the speed change gear 11 in the wheel loader 1, more specially in a portion necessary for the switching of transmission (connection and joint) and the cutoff (release and disconnection) of rotation between a pair of rotating shafts 22, 43. An explanation will be later made of the details of the portion for attaching the power transmission device 21. In addition, FIG. 3 to FIG. 6 (FIG. 12, FIG. 13, FIG. 17 and FIG. 18 which will be later described) each are a longitudinal sectional view of the power transmission device 21 and illustrate a radial half of the power transmission device 21.

The power transmission device 21 is provided with the first rotating shaft 22, a piston 32, an oil chamber 37, the second rotating shaft 43 and a synchronizer ring 51. The first rotating shaft 22 and the second rotating shaft 43 are arranged coaxially. The first rotating shaft 22 and the second rotating shaft 43 are configured to be capable of performing relative rotation to each other. The power transmission device 21 can be switched between "connection state (joint state)" for transmission of the rotation (torque, rotating forces and power) and "cutoff state (release state)" for cutoff of the transmission of the rotation between the first rotating shaft 22 and the second rotating shaft 43.

The first rotating shaft 22 and the second rotating shaft 43 are supported to each other by rolling bearings 28A, 28B. More specifically the first rotating shaft 22 and the second rotating shaft 43 are supported to be capable of performing relative rotation to each other and to be coaxial with each other by a pair of radial needle rolling bearings 28A, 28A and a pair of thrust needle rolling bearings 28B, 28B. The support by the rolling bearings 28A, 28B can make the friction smaller than the support by sliding (that is, support by slide bearing). Thereby, the power transmission device 21, even in a case where a rotating speed of the first rotating shaft 22 is different from a rotating speed of the second rotating shaft 43, that is, even in a case where the first rotating shaft 22 and the second rotating shaft 43 perform relative rotation to each other, the loss of power can be made small by the rolling bearings 28A, 28B. The first rotating shaft 22 and the second rotating shaft 43 are supported by the rolling bearings 28A, 28B but there is no sliding surface therebetween, and therefore, the power loss at the relative rotating is made small.

The transmission of the torque between the first rotating shaft 22 and the second rotating shaft 43 is made possible both in a case where the rotation is transmitted from the first rotating shaft 22 to the second rotating shaft 43 and in a case where the rotation is transmitted from the second rotating shaft 43 to the first rotating shaft 22. A rotational direction (functional direction of the torque) may have right-hand rotation (clockwise rotation) or left-hand rotation (counter-clockwise rotation) at the center of a center axis A-A of the first rotating shaft 22 and the second rotating shaft 43. At the cutoff state (release state) the first rotating shaft 22 and the second rotating shaft 43 may rotate in the same direction or in the reverse direction. At the cutoff state (release state) a rotating speed of the first rotating shaft 22 may be faster than a rotating speed of the second rotating shaft 43 and the rotating speed of the second rotating shaft 43 may be faster than the rotating speed of the first rotating shaft 22.

The first rotating shaft 22 is provided with a small diameter portion 23, a piston fitting portion 24, a cylinder portion 25, a hydraulic oil delivery line 26 and a cooling line 27. The small diameter portion 23 is inserted in a bottomed hole 46 of the second rotating shaft 43. The piston fitting portion 24 has an outer diameter dimension larger than the small diameter portion 23. A return spring 31 and the piston 32 are fitted on an outer peripheral side of the piston fitting portion 24. The cylinder portion 25 is disposed radially outside of the piston fitting portion 24 and has a cylindrical part 25A and a bottom part 25B. A plurality of pawls 25A1 extending in an axial direction of the cylindrical part 25A are formed on an inner peripheral side of the cylindrical part 25A to be circumferentially separated from each other. The pawls 25A1 of the cylindrical part 25A are engaged with pawls 34A formed on an outer diameter-side cylindrical part 34 of the piston 32. The piston 32 is mounted between an outer peripheral surface of the piston fitting portion 24 and an inner peripheral surface of the cylindrical part 25A of the cylinder portion 25.

An entire peripheral groove 24A is formed on the outer peripheral surface of the piston fitting portion 24 for installing a stop ring 29. A washer 30 and the return spring 31 are arranged between the stop ring 29 and the piston 32. The return spring 31 moves the piston 32 to the bottom part 25B (the right side of each of FIG. 3 to FIG. 6) of the cylinder portion 25 when a liquid pressure (pressure) in the oil chamber 37 surrounded by the piston fitting portion 24, the cylinder portion 25 and the piston 32 is reduced.

The hydraulic oil delivery line 26 delivers hydraulic oil to the oil chamber 37. The hydraulic oil delivery line 26 is provided with an axial line 26A extending in the axial direction of the first rotating shaft 22 and a radial line 26B extending in a radial direction of the first rotating shaft 22 from the axial line 26A toward the oil chamber 37. The piston 32 moves in the axial direction relative to the first rotating shaft 22 by the delivery of the hydraulic oil from a hydraulic source (liquid pressure delivery source) of an unillustrated hydraulic pump or the like through the hydraulic oil delivery line 26 to the oil chamber 37 or the discharge of the hydraulic oil in the oil chamber 37 through the hydraulic oil delivery line 26.

The cooling line 27 delivers hydraulic oil as cooling oil between the first rotating shaft 22 and the second rotating shaft 43. The cooling line 27 extends in the axial direction of the first rotating shaft 22, and the downstream side thereof in a flow direction of the cooling liquid opens to an end surface of the small diameter portion 23 of the first rotating shaft 22. The cooling liquid is supplied through the cooling line 27 to a clearance between the small diameter portion 23 of the first rotating shaft 22 and the bottomed hole 46 of the second rotating shaft 43. The cooling liquid delivered to this clearance is delivered through a cooling line 48 of the second rotating shaft 43 to friction surfaces of friction plates 54, 55.

The piston 32 is arranged on the periphery of the first rotating shaft 22 to be movable in the axial direction (in the center axial A-A direction and in a left-right direction in each of FIG. 3 to FIG. 6) relative to the first rotating shaft 22. The oil chamber 37 is disposed between the first rotating shaft 22 and the piston 32. The hydraulic oil (operating liquid) is delivered to or discharged from the oil chamber 37 to move the piston 32 in the axial direction of the first rotating shaft 22. Therefore, the hydraulic oil delivery line 26 is communicated with the oil chamber 37 for delivery and discharge of the hydraulic oil. The piston 32 moves toward the second rotating shaft 43-side (the left side of each in FIG. 3 to FIG. 6) when the hydraulic oil is delivered through the hydraulic oil delivery line 26 to oil chamber 37.

The piston 32 is formed in a cylindrical shape as a whole. The piston 32 is provided with an inner diameter-side cylindrical part 33, an outer diameter-side cylindrical part 34 and a joint part 35. The inner diameter-side cylindrical part 33 is fitted on the outer peripheral side of the piston fitting portion 24 of the first rotating shaft 22. The outer diameter-side cylindrical part is positioned closer to a radial outside than the inner diameter-side cylindrical part 33 to be fitted on the inner peripheral side of the cylindrical part 25A of the cylinder portion 25. The joint part 35 is formed in an annular shape and joints between the inner diameter-side cylindrical part 33 and the outer diameter-side cylindrical part 34. The plurality of pawls 34A in the axial direction extending are formed on the outer peripheral side of the piston 32, that is, on the outer peripheral side of the outer diameter-side cylindrical part 34 to be separated in the circumferential direction. The pawls 34A of the piston 32 are meshed (engaged) with the pawls 25A1 of the first rotating shaft 22 (cylindrical part 25A). The piston 32 rotates at the center of the center axis A-A together with the first rotating shaft 22 based upon the meshing of the pawls 34A and the pawls 25A1. As a result, the piston 32 is disposed in the first rotating shaft 22 in a state where an axial movement to the first rotating shaft 22 is made possible and a circumferential (rotating-direction) movement to the first rotating shaft 22 is blocked.

The piston 32 is provided with first pawl portions 38. That is, a plurality of the first pawl portions 38 in the axial direction extending are formed to be separated in the circumferential direction on the inner peripheral side of the outer diameter-side cylindrical part 34 of the piston 32. The first pawl portions 38 are engaged with third pawl portions 52 of the synchronizer ring 51 when the piston 32 is moved to the second rotating shaft 43-side (the synchronizer ring 51-side). The first pawl portions 38 are engaged with second pawl portions 47 of the second rotating shaft 43 when the piston 32 is moved further to the second rotating shaft 43-side from a state of being engaged with the third pawl portions 52. The piston 32 and the first rotating shaft 22 rotate together with the second rotating shaft 43 based upon the engagement of the first pawl portions 38 and the second pawl portions 47.

The joint part 35 of the piston 32 is, when the liquid pressure (pressure) in the oil chamber 37 becomes equal to or less than a predetermined value, provided with a valve 36 for relief of the pressure having remained in the oil chamber 37. The valve 36 is provided with a through hole 36A extending in the axial direction of the piston 32 and a ball 36B arranged in the through hole 36A. The through hole 36A is provided with a small diameter portion having a small inner diameter dimension and a large diameter part having an inner diameter dimension larger than this small diameter portion. The ball 36B is arranged in the large diameter part of the through hole 36A. When the hydraulic oil is delivered into the oil chamber 37, the ball 36B clogs the small diameter portion. The valve 36 opens when the ball 36B moves away from the small diameter portion by the liquid pressure in the oil chamber 37 being reduced. The valve 36 may be disposed on the first rotating shaft 22-side, for example, the bottom part 25B of the cylinder portion 25.

A key ring 39 is disposed on the inner peripheral side of the outer diameter-side cylindrical part 34 of the piston 32. The key ring 39 is disposed to be coaxial with the piston 32. The key ring 39 is attached on the first pawl portion 38 of the piston 32 to be movable in the axial direction. An entire peripheral groove 41 is installed on the inner peripheral side (in other words, the first pawl portion 38) of the outer diameter-side cylindrical part 34 for attaching a stop ring 40. The key ring 39 is urged to the stop ring 40-side by a spring 42. The key ring 39 becomes engaged with key grooves 53 of the synchronizer ring 51 when the piston 32 moves to the second rotating shaft 43-side.

The key ring 39 is provided with a ring part 39A and a cylindrical part 39B. A plurality of concave portions (unillustrated) are arranged to be separated in a circumferential direction on an outer peripheral side of the ring part 39A. The concave portions are engaged with the first pawl portions 38 of the piston 32. Thereby, the key ring 39 and the piston 32 are restricted in the rotating direction for axial movement (relative movement) to be made possible. That is, the key ring 39 is disposed in the piston 32 in a state where a circumferential movement relative to the piston 32 is blocked by the engagement between the concave portions of the ring part 39A and the first pawl portions 38 of the piston 32.

The cylindrical part 39B extends from an inner diameter side of the ring part 39A to the synchronizer ring 51-side. A plurality of projections 39B1 axially projecting are arranged to be separated in a circumferential direction on a tip end side of the cylindrical part 39B, that is, to the synchronizer ring 51-side. The projections 39B1 are arranged to correspond to the key grooves 53 arranged in the synchronizer ring 51. The key ring 39 becomes engaged with the key grooves 53 of the synchronizer ring 51 through the engagement of the key grooves 53 with the projections 39B1 when the piston 32 moves to the second rotating shaft 43-side. The key ring 39 is axially movable between the stop ring 40 and the spring 42.

The second rotating shaft 43 is disposed to be coaxial with the first rotating shaft 22 and to be capable of performing relative rotation to the first rotating shaft 22. The second rotating shaft 43 has second pawl portions 47 engageable with the first pawl portions 38. That is, the second rotating shaft 43 is provided with a small diameter portion 44, an annular collar portion 45 and the bottomed hole 46. The small diameter portion 44 is disposed in a tip end side of the second rotating shaft 43, that is, on the first rotating shaft 22-side. The small diameter portion 44 has, for example, an outer diameter dimension similar to the piston fitting portion 24 of the first rotating shaft 22. The synchronizer ring 51 is fitted on an outer peripheral side of the small diameter portion 44 to be capable of performing relative rotation thereto. A plurality of extending convex parts 44A in the axial direction are arranged to be separated in a circumferential direction on the small diameter portion 44. Concave parts (unillustrated) formed on the inner peripheral side of the first friction plate 54 is engaged with the convex parts 44A. Thereby, the first friction plate 54 rotates together with the second rotating shaft 43.

The annular collar portion 45 has an outer diameter dimension larger than the small diameter portion 44. A plurality of the second pawl portions 47 extending in the axial direction are formed to be separated in the circumferential direction on an outer peripheral side of the annular collar portion 45. The second pawl portions 47 are engaged with the first pawl portions 38 of the piston 32 when the piston 32 is moved to the second rotating shaft 43-side. The second rotating shaft 43 rotates together with the first rotating shaft 22 based upon the engagement of the second pawl portions 47 and the first pawl portions 38. That is, the first rotating shaft 22 and the second rotating shaft 43 are connected to be capable of transmitting rotation by the engagement of the first pawl portions 38 of the piston 32 and the second pawl portions 47 of the second rotating shaft 43 based upon the delivery of the hydraulic oil to the oil chamber 37.

The bottomed hole 46 is disposed in an inner diameter side of the small diameter portion 44 and the annular collar portion 45. The small diameter portion 23 of the first rotating shaft 22 is inserted in the bottomed hole 46. The radial needle rolling bearings 28A, 28A are arranged between "an inner peripheral surface of the bottomed hole 46" and "an outer peripheral surface of the small diameter portion 23". The thrust needle rolling bearing 28B is disposed between "a bottom surface of the bottomed hole 46" and "an end surface of the small diameter portion 23 of the first rotating shaft 22". The thrust needle rolling bearing 28B is disposed between "an end surface of the second rotating shaft 43 at the small diameter portion 44-side of the second rotating shaft 43" and "an end surface of the first rotating shaft 22" for connection of the small diameter portion 23 and the piston fitting portion 24.

The small diameter portion 44 of the second rotating shaft 43 is provided with the cooling line 48 extending radially. The cooling line 48 is formed as a through hole penetrating between the outer peripheral side of the small diameter portion 44 and the inner peripheral side of the bottomed hole 46. An entire peripheral groove 44B is formed in the small diameter portion 44 to install the stop ring 49. A washer 50, the synchronizer ring 51 and the friction plates 54, 55 between the annular collar portion 45 of the second rotating shaft 43 and the stop ring 49.

The synchronizer ring 51 is supported on the second rotating shaft 43 to be coaxial therewith. The synchronizer ring 51 has a sliding surface that is movable in the axial direction and in the circumferential direction (in the rotating direction) relative to the second rotating shaft 43. That is, the small diameter portion 44 of the second rotating shaft 43 is inserted in the inner peripheral side of the synchronizer ring 51. In this case, an inner peripheral surface 51A of the synchronizer ring 51 becomes a sliding surface that is movable in the axial direction and in the circumferential direction relative to the outer peripheral surface of the small diameter portion 44 of the second rotating shaft 43. Thereby, the synchronizer ring 51 is installed to be movable (displaceable) in the axial direction and in the circumferential direction relative to the second rotating shaft 43. The synchronizer ring 51 and the friction plates 54, 55 are movable in the axial direction slightly, for example, approximately from 0.5 mm to 1.0 mm between the stop ring 49 (washer 50) and the annular collar portion 45 of the second rotating shaft 43.

The synchronizer ring 51 is loosely fitted on the outer peripheral side of the small diameter portion 44 of the second rotating shaft 43. When the power transmission device 21 is in the cutoff state, the synchronizer ring 51 can freely move (slide) in the rotating direction relative to the second rotating shaft 43. Therefore, the synchronizer ring 51 and the second rotating shaft 43 do not rotate together. However, the synchronizer ring 51 rotates together with the second rotating shaft 43 due to a friction resistance of the friction surface with the second rotating shaft 43. For example, when the second rotating shaft 43 rotates constantly, a rotating speed of the second rotating shaft 43 becomes approximately equal to that of the synchronizer ring 51. On the other hand, when the rotating speed of the second rotating shaft 43 varies, the rotating speed of the second rotating shaft 43 becomes different from that of the synchronizer ring 51.

The synchronizer ring 51 has third pawl portions 52 engageable with the first pawl portions 38 of the piston 32. That is, a plurality of the third pawl portions 52 are formed to be separated in the circumferential direction on the outer peripheral side of the synchronizer ring 51. The third pawl portions 52 are engaged with the first pawl portions 38 of the piston 32 when the piston 32 is moved to the second rotating shaft 43-side (synchronizer ring 51-side). The first pawl portions 38 of the piston 32 are engaged with the third pawl portions 52 of the synchronizer ring 51 prior to the engagement with the second pawl portions 47 at the time of being engaged with the second pawl portions 47 of the second rotating shaft 43 based upon the delivery of the hydraulic oil to the oil chamber 37.

A plurality of the key grooves 53 are arranged to be separated in the circumferential direction on an end surface of the synchronizer ring 51, that is, the end surface at the piston 32-side. The projections 39B1 of the key ring 39 are engaged with the key grooves 53. The key ring 39 (projections 39B1) becomes engaged with the key grooves 53 of the synchronizer ring 51 prior to the engagement of the first pawl portions 38 and the third pawl portions 52 when the first pawl portions 38 of the piston 32 are engaged with and the third pawl portions 52 of the synchronizer ring 51.

The synchronizer ring 51 is provided with a cylindrical portion 51B, which is positioned on the outer peripheral side, projects toward the annular collar portion 45 of the second rotating shaft 43. A plurality of axially extending convex parts 51B1 are arranged to be separated in the circumferential direction on the inner peripheral side of the cylindrical portion 51B. Concave parts (unillustrated) formed on an outer peripheral side of the second friction plate 55 are engaged with the convex parts 51B1. Thereby, the second friction plate 55 rotates together with the synchronizer ring 51.

The first friction plate 54 and the second friction plate 55 are arranged between the synchronizer ring 51 and the second rotating shaft 43. The first friction plate 54 is all the time meshed with the convex parts 44A of the second rotating shaft 43. In this case, concave parts are disposed on an inner peripheral side of the first friction 54 to be engaged with the convex parts 44A disposed in the small diameter portion 44 of the second rotating shaft 43. The first friction plate 54 is attached on the second rotating shaft 43 in a state where an axial movement relative to the second rotating shaft 43 is made possible and a circumferential (rotating-direction) movement relative to the second rotating shaft 43 is blocked by the engagement of the concave parts and the convex parts 44A. That is, the first friction plate 54 is disposed in a state where the circumferential (rotating-direction) movement relative to the second rotating shaft 43 is blocked and is held between the synchronizer ring 51 and the second rotating shaft 43.

On the other hand, the second friction plate 55 is all the time meshed with the convex parts 51B1 of the synchronizer ring 51. In this case, concave parts are disposed on the outer peripheral side of the second friction plate 55 to be engaged with the convex parts 51B1 disposed in the cylindrical portion 51B of the synchronizer ring 51. The second friction plate 55 is attached in the synchronizer ring 51 in a state where an axial movement relative to the synchronizer ring 51 is made possible and a circumferential (rotating direction) movement relative to the synchronizer ring 51 is blocked by the engagement of the concave parts and the convex parts 51B1. That is, the second friction plate 55 is disposed in a state where the circumferential movement relative to the synchronizer ring 51 is blocked, and is held between the synchronizer ring 51 and the second rotating shaft 43.

In the first embodiment, the friction plates 54, 55 as sliding members and the synchronizer ring 51 are supported by the second rotating shaft 43. Therefore, at "the cutoff state (release state)" where the transmission of the rotation is cut off between the first rotating shaft 22 and the second rotating shaft 43, the loss of the power by the sliding members can be reduced. Further, since the rolling bearings 28A, 28B are arranged between the first rotating shaft 22 and the second rotating shaft 43 for support, the loss of the power to the sliding bearing can be reduced. The heat generation can be reduced by these two kinds of reduction effects on the loss of the power. Thereby, the amount of the cooling liquids to be delivered for cooling the power transmission device 21 can be reduced.

In this case, the cooling to the power transmission device 21 can be performed through the cooling line 27 of the first rotating shaft 22 and the cooling line 48 of the second rotating shaft 43. That is, the cooling liquid are delivered through the cooling lines 27, 28 to the friction plates 54, 55 between the annular collar portion 45 of the second rotating shaft 43 and the synchronizer ring 51. At this time, the cooling liquids are centrifugally released to the outer diameter side by the rotation of the first rotating shaft 22 and the second rotating shaft 43. Therefore, as the amount of the cooling liquids is the smaller, the loss of the power by the cooling liquids being centrifugally released can be the more reduced. In the first embodiment, the amount of the cooling liquids can be reduced, and therefore, it is possible to reduce the loss of the power from this point as well.

Next, an explanation will be made of a shape of the first pawl portion 38 disposed in the piston 32, a shape of the second pawl portion 47 disposed in the second rotating shaft 43 and a shape of the third pawl portion 52 disposed in the synchronizer ring 51 with reference to FIG. 7 to FIG. 11.

The first pawl portions 38 are disposed on an inner peripheral side of the outer diameter-side cylindrical part 34 of the piston 32. As illustrated in FIG. 7 to FIG. 11, aside surface of the first pawl portion 38 changes by three steps from the second rotating shaft 43-side as the tip end side toward the joint part 35-side of the piston 32 as the base end side. In this case, the first pawl portion 38 is provided with a first inclination part 38A as an obtuse angle, a second inclination part 38B as an acute angle and a parallel part 38C in order from the tip end side. The first inclination part 38A forms the tip end side of the first pawl portion 38. As illustrated in FIG. 9, the first inclination part 38A becomes a side surface 38A1 inclined in such a direction that the thickness of the first pawl portion 38 is made smaller toward the tip end side. A chamfer is disposed in the first inclination part 38A to be inclined in such a direction that the height is made smaller toward the tip end side. The second inclination part 38B extends from the first inclination part 38A toward the base end side of the first pawl portion 38 and connects between the first inclination part 38A and the parallel part 38C. The second inclination part 38B becomes a side surface 38B1 inclined in such a direction that the thickness of the first pawl portion 38 is made smaller toward the first inclination part 38A. An inclination angle of the first inclination part 38A, that is, an angle between aside surface 38A1 of the first inclination part 38A and a centerline B-B of the first pawl portion 38 is made larger than an inclination angle of the second inclination part 38B, that is, an angle between the side surface 38B1 of the second inclination part 38B and the centerline B-B. The parallel part 38C becomes a side surface in parallel to the center line B-B as a direction where the first pawl portion 38 extends. The parallel part 38C may be formed as, for example, a side surface (inclination surface) inclined to the center line B-B, but becomes preferably a side surface (parallel surface) in parallel thereto.

The second pawl portions 47 are disposed on an outer peripheral side of the annular collar portion 45 of the second rotating shaft 43. A side surface of the second pawl portion 47 changes by two steps from the piston 32-side as the tip end side in a direction of moving away from the piston 32 as the base end side. In this case, the second pawl portion 47 is provided with a first inclination part 47A as an obtuse angle and a second inclination part 47B as an acute angle in order from the tip end side. The first inclination part 47A forms the tip end side of the second pawl portion 47. The first inclination part 47A becomes a side surface 47A1 inclined in such a direction that the thickness of the second pawl portion 47 is made smaller toward the tip end side. A chamfer is disposed in the first inclination part 47A to be inclined in such a direction that the height is made smaller toward the tip end side. The second inclination part 47B extends from the first inclination part 47A toward the base end side of the second pawl portion 47. The second inclination part 47B becomes a side surface 47B1 inclined in such a direction that the thickness of the second pawl portion 47 is made smaller toward the first inclination part 47A. An inclination angle of the first inclination part 47A, that is, an angle between a side surface 47A1 of the first inclination part 47A and a center line C-C of the second pawl portion 47 is made larger than an inclination angle of the second inclination part 47B, that is, an angle between the side surface 47B1 of the second inclination part 47B and the center line C-C.

The third pawl portions 52 are disposed on an outer peripheral side of the synchronizer ring 51. A side surface of the third pawl portion 52 changes by two steps from the piston 32-side as the tip end side in a direction of moving away from the piston 32 as the base end side. In this case, the third pawl portion 52 is provided with a first inclination part 52A as an obtuse angle and a second inclination part 52B as an acute angle in order from the tip end side. The first inclination part 52A forms the tip end side of the third pawl portion 52. The first inclination part 52A becomes a side surface 52A1 inclined in such a direction that the thickness of the third pawl portion 52 is made smaller toward the tip end side. A chamfer is disposed in the first inclination part 52A to be inclined in a direction where the height is made lower toward the tip end side. The second inclination part 52B extends from the first inclination part 52A toward the base end side of the third pawl portion 52. The second inclination part 52B becomes a side surface 52B1 inclined in such a direction that the thickness of the third pawl portion 52 is made smaller toward the first inclination part 52A. An inclination angle of the first inclination part 52A, that is, an angle between the side surface 52A1 of the first inclination part 52A and a center line D-D of the third pawl portion 52 is made larger than an inclination angle of the second inclination part 52B, that is, an angle between the side surface 52B1 of the second inclination part 52B and the center line D-D. The second inclination part 52B may be formed as, for example, a side surface (parallel surface) in parallel to the center line D-D, but becomes preferably a side surface (inclination surface) inclined thereto.

Figure 11:
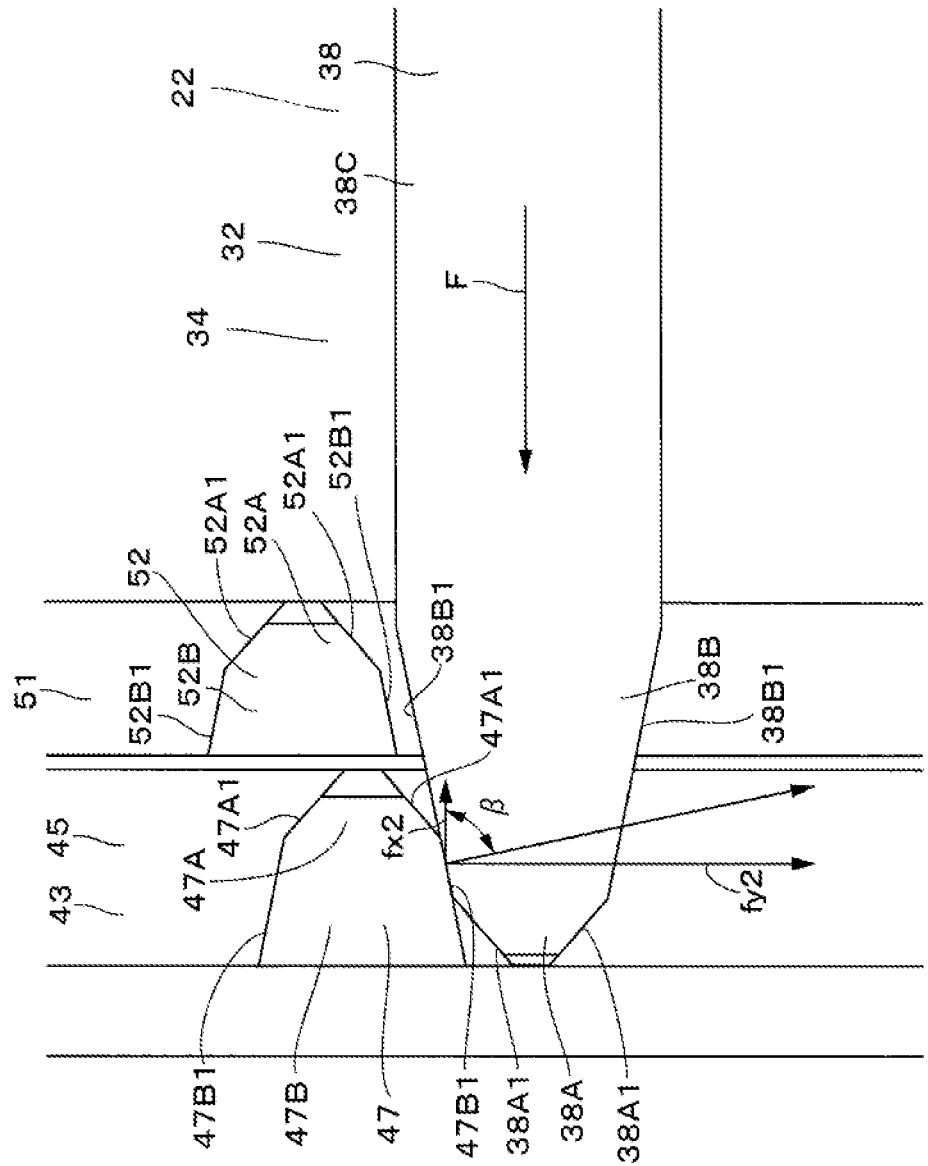
FIG. 11 is an enlarged view illustrating an (XI) part in FIG. 10.

Here, as illustrated in FIG. 11, the side surface 38B1 of the second inclination part 38B in the first pawl portion 38 and the side surface 47B1 of the second inclination part 47B in the second pawl portion 47 become engagement surfaces for abutment thereof when the first pawl portion 38 is engaged with the second pawl portion 47. The engagement surfaces (the side surface 38B1 of the second inclination part 38B and the side surface 47B1 of the second inclination part 47B) formed in inclination surfaces so that a force is applied to the first pawl portion 38 and the second pawl portion 47 in the direction of moving away from each other in the axial direction when a rotating force is transmitted between the first rotating shaft 22 and the second rotating shaft 43.

In addition, as illustrated in FIG. 9, the side surface 38A1 of the first inclination part 38A in the first pawl portion 38 and the side surface 52A1 of the first inclination part 52A in the third pawl portion 52 become tip end-side engagement surfaces for abutment thereof when the first pawl portion 38 is engaged with the third pawl portion 52. That is, the side surface 38A1 of the first inclination part 38A is disposed as a tip end-side engagement surface closer to a tip end side of the first pawl portion 38 than an engagement surface (the side surface 38B1 of the second inclination part 38B) of the first pawl portion 38 engaging with the second pawl portion 47. The tip end-side engagement surface, that is, the side surface 38A1 of the first inclination part 38A becomes engaged with the side surface 52A1 of the first inclination part 52A in the third pawl portion 52 prior to the engagement of the first pawl portion 38 and the second pawl portion 47.

In this way, in the first embodiment, the first pawl portion 38 is provided with the first inclination part 38A and the second inclination part 38B. The first inclination part 38A corresponds to a first engagement part as a part to be engaged with the third pawl portion 52 (the first inclination part 52A thereof). The second inclination part 38B corresponds to a second engagement part as a part to be engaged with the second pawl portion 47 (the second inclination part 47B thereof). In this case, the first inclination part 38A and the second inclination part 38B are formed in the piston 32 as a single continuous pawl portion having the same inner diameter dimension.

An explanation will be made of an operation of the power transmission device 21 at the time of switching from the cutoff state (release state) to the connection state (joint state) of the power transmission device 21.

Figure 3:
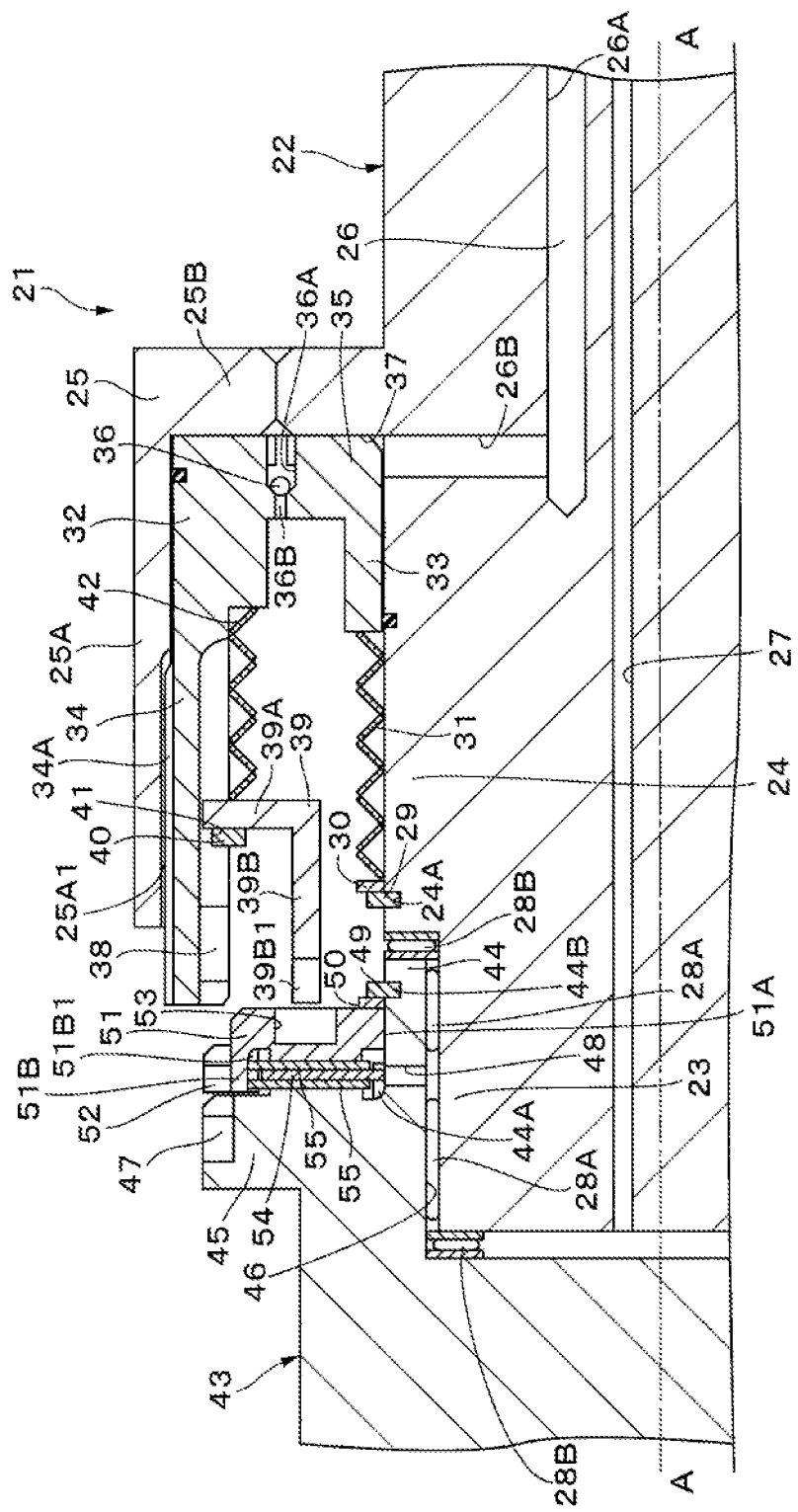
FIG. 3 is a longitudinal sectional view illustrating the power transmission device in a cutoff state where the transmission of rotation is cut off according to the first embodiment.
Figure 4:
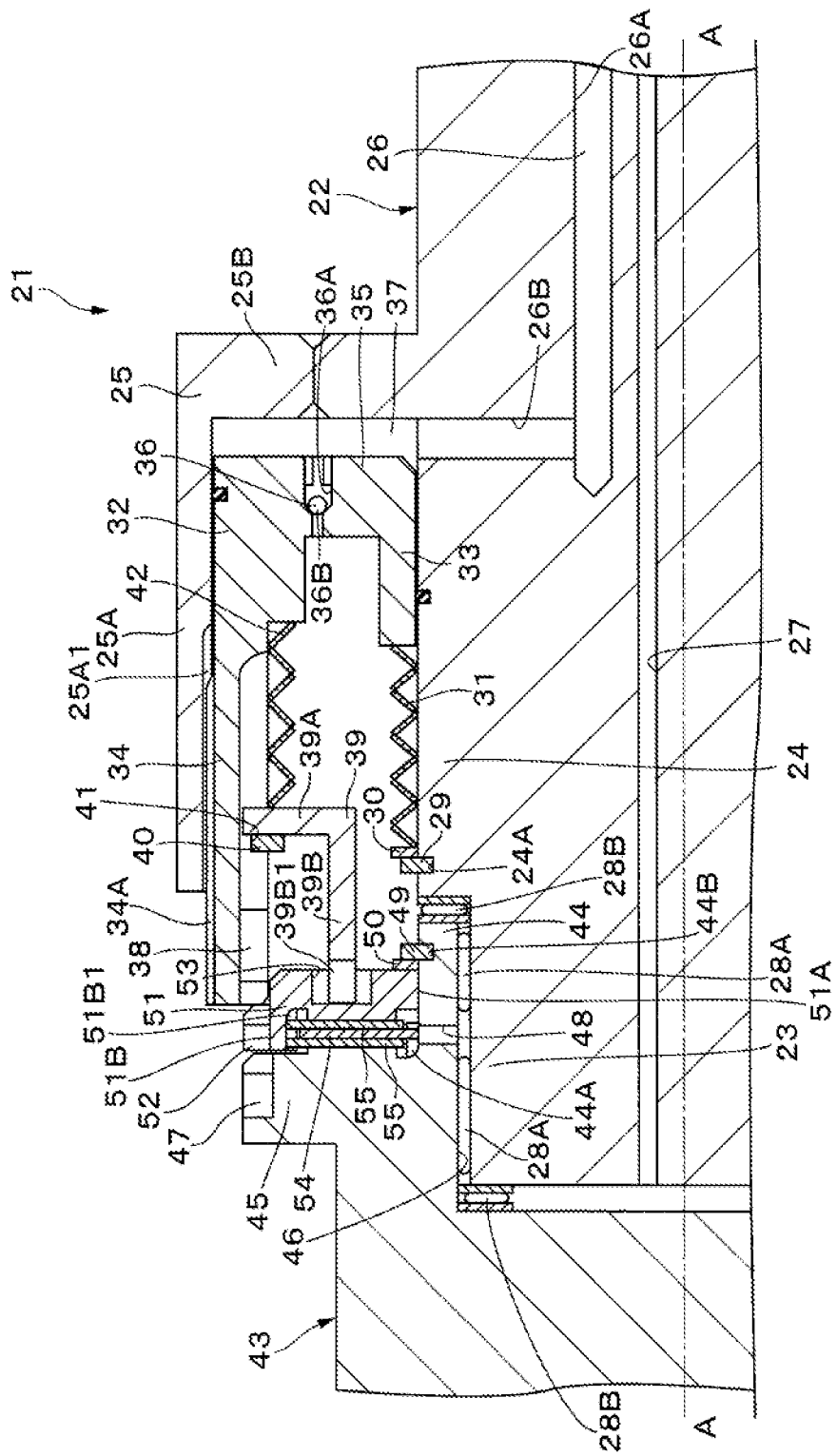
FIG. 4 is a longitudinal sectional view illustrating a state where a key ring of a piston is engaged with a key groove of a synchronizer ring in a position as similar to that in FIG. 3.
Figure 7:
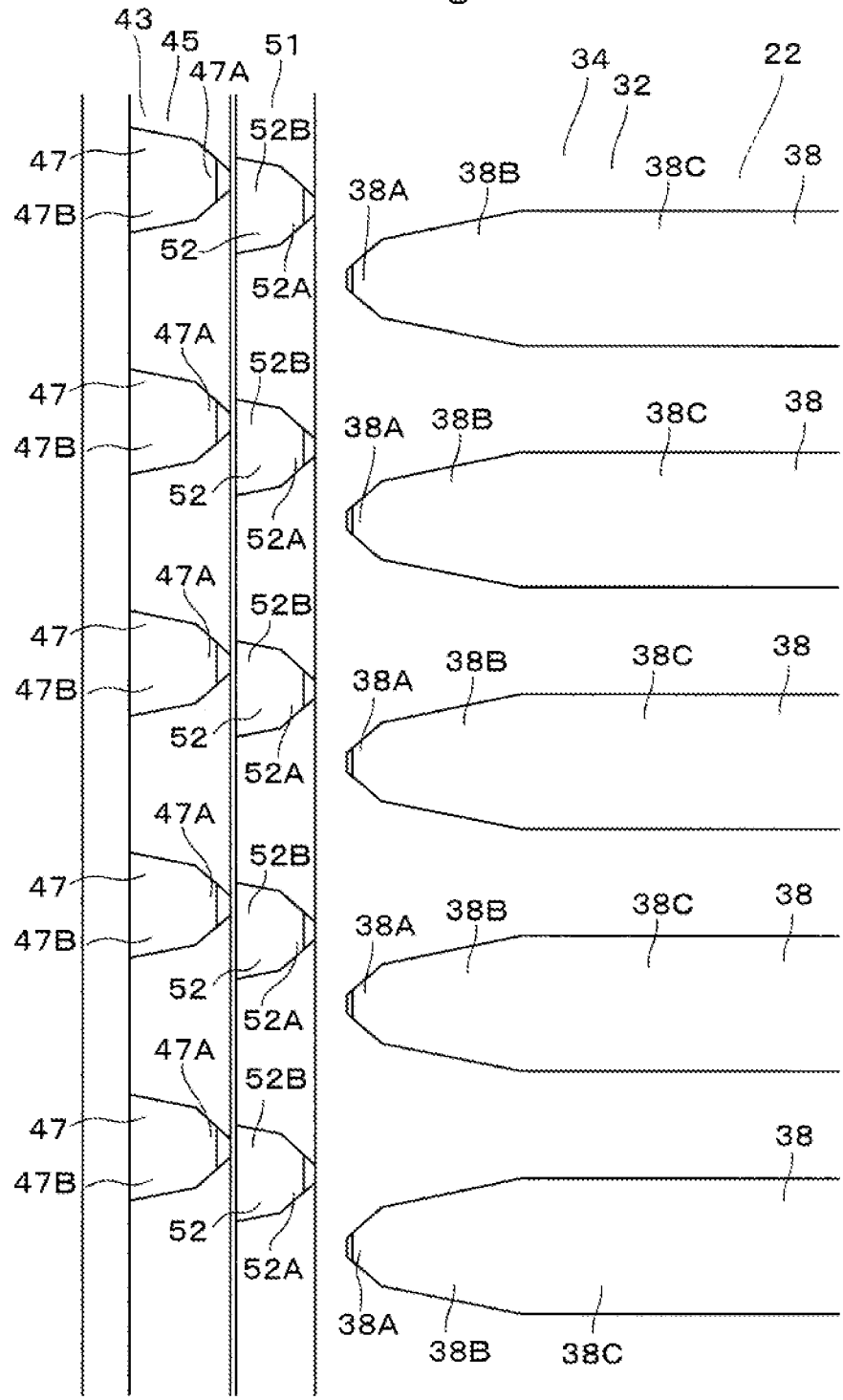
FIG. 7 is an explanatory diagram illustrating an example of a positional relation between the first pawl portion, the second pawl portion, and the third pawl portion in a state before the engagement between the first pawl portion and the third pawl portion.

FIG. 3 and FIG. 7 illustrate the cutoff state of the power transmission device 21, that is, a state where the transmission of the rotation is cut off between the first rotating shaft 22 and the second rotating shaft 43. When the hydraulic oil is delivered to the oil chamber 37 from this cutoff state, the piston 32 moves to the second rotating shaft 43-side. Thereby, as illustrated in FIG. 4, the projections 39B1 of the key ring 39 disposed in the piston 32 are engaged with the key grooves 53 of the synchronizer ring 51, and the synchronizer ring 51 and the piston 32 begin to rotate integrally. In this way, when the synchronizer ring 51 is synchronized with the piston 32 in rotation, the engagement between the first pawl portion 38 and the third pawl portion 52 which will be next performed, that is, the contact between the first inclination part 38A of the first pawl portion 38 and the first inclination part 52A of the third pawl portion 52 can smoothly be made. For increasing responsiveness of the piston 32, the oil chamber 37 may be kept in a positive pressure, that is, even in the cutoff state.

Figure 5:
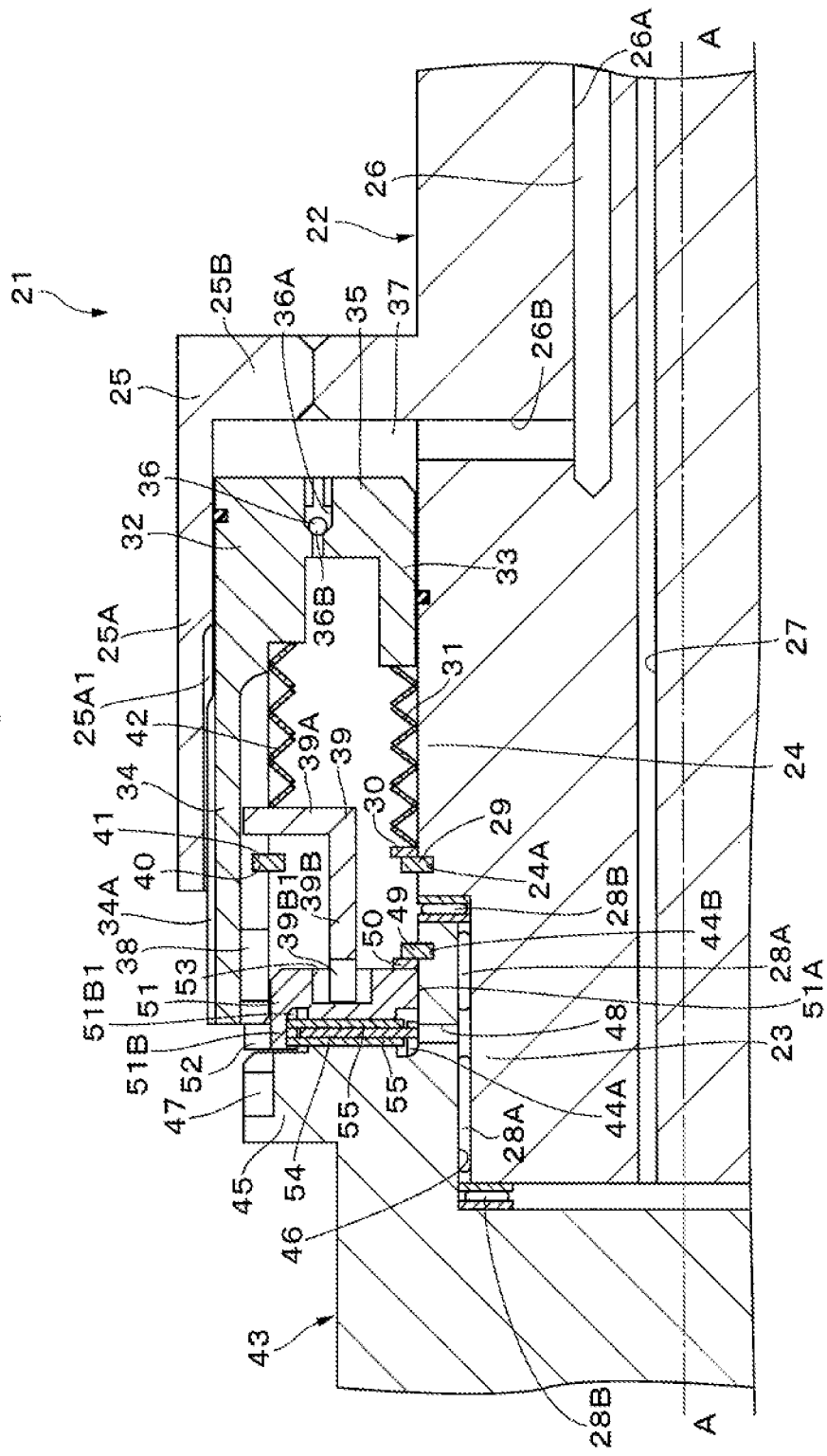
FIG. 5 is a longitudinal sectional view illustrating a state where a first pawl portion of the piston is engaged with a third pawl portion of the synchronizer ring in a position as similar to that in FIG. 3.
Figure 8:
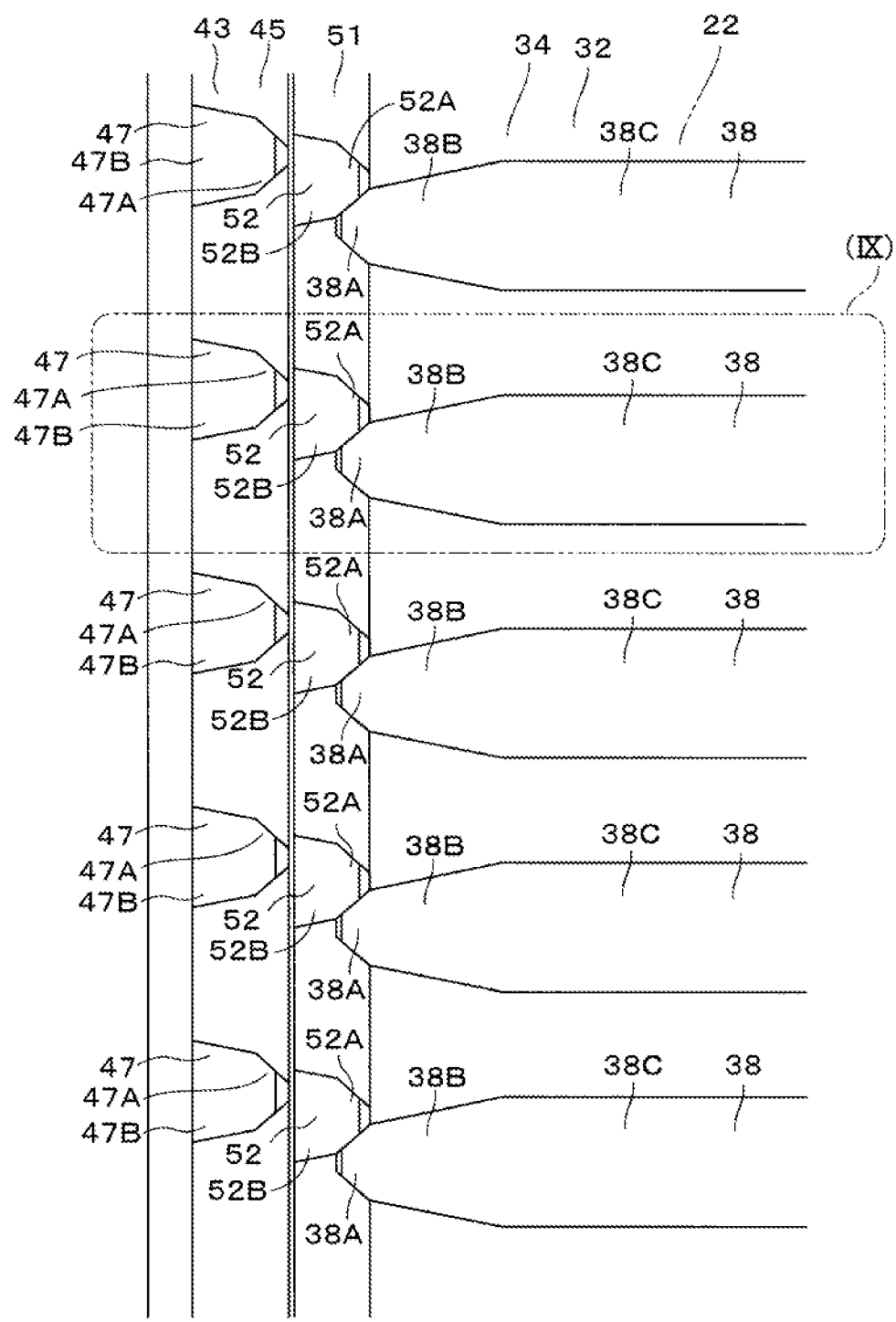
FIG. 8 is an explanatory diagram illustrating an example of a positional relation between the first pawl portion, the second pawl portion, and the third pawl portion in a state of the engagement between the first pawl portion and the third pawl portion.
Figure 9:
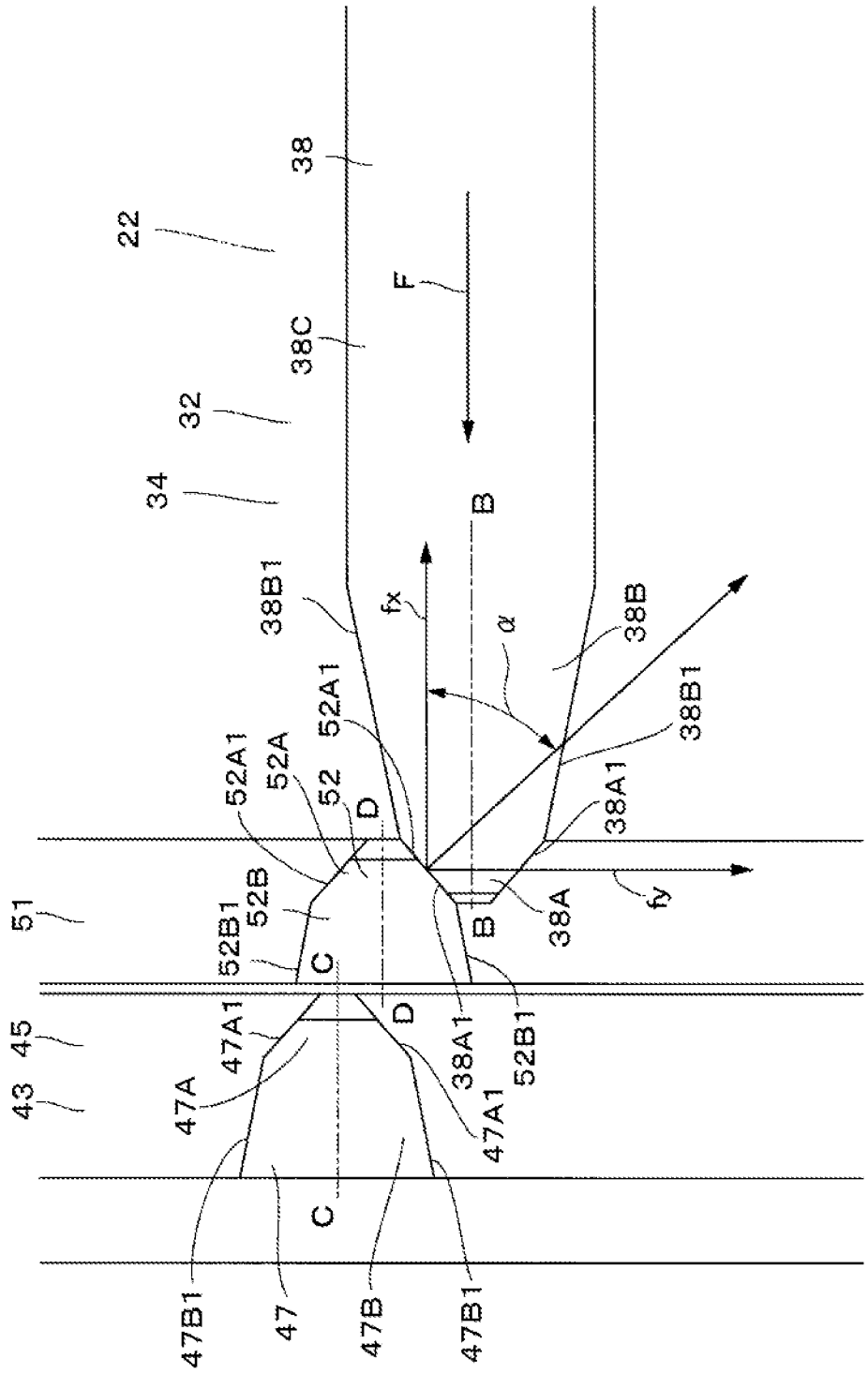
FIG. 9 is an enlarged view illustrating an (IX) part in FIG. 8.

When the piston 32 further moves to the second rotating shaft 43 from a state in FIG. 4, as illustrated in FIG. 5 and FIG. 8, the first pawl portion 38 of the piston 32 and the third pawl portion 52 of the synchronizer ring 51 are engaged to each other. That is, as illustrated in FIG. 8 and FIG. 9, the first inclination part 38A of the first pawl portion 38 makes contact with the first inclination part 52A of the third pawl portion 52. Here, FIG. 8 illustrates a contact state between the first pawl portion 38 and the third pawl portion 52. FIG. 9 illustrates forces generating between the first pawl portion 38 and the third pawl portion 52. The first inclination part 38A of the first pawl portion 38 axially presses the first inclination part 52A of the third pawl portion 52 by a force F. Thereby, the synchronizer ring 51 is pressed against the annular collar portion 45 of the second rotating shaft 43. As a result, friction forces are generated between the friction plates 54, 55 and between the annular collar portion 45 and the friction plate 55 on the annular collar portion 45-side, and torque T is applied to the second rotating shaft 43 and the first rotating shaft 22 in a direction of each rotation of being synchronized. The torque T can be expressed according to the next Formula 1, wherein the force of the first pawl portion 38 based upon the delivery of hydraulic oil to the oil chamber 37 is indicated at F, a friction coefficient is indicated at p, the number of the friction surfaces is indicated at N and an effective friction radium is indicated at m.

$$T = F \times \mu \times N \times m \qquad \text{[Formula 1]}$$

As illustrated in FIG. 9, torque T applied to the synchronizer ring 51 generates a force fy for rotating the first inclination part 38A of the first pawl portion 38 through the first inclination part 52A of the third pawl portion 52. The force fy can be expressed according to the next Formula 2, wherein torque is indicated at T, and a distance from the center axis A-A to an engagement point with the first inclination part 52A and the first inclination part 38A.

$$fy = \frac{T}{L} \qquad \text{[Formula 2]}$$

The contact between the first inclination part 52A and the first inclination part 38A is inclined at an angle of α, and therefore, the force fx as a component force is generated. At this time, the force fx and the force fy have a relation of the next Formula 3.

$$fx = \frac{fy}{\tan\alpha} \qquad \text{[Formula 3]}$$

Therefore, the piston 32 is pushed back to the bottom part 25B-side of the cylinder portion 25 by the force fx. By setting the fx to the force F or more (fx F) because of this function, in a state where the first rotating shaft 22 and the second rotating shaft 43 are not synchronized in rotation, it is possible for the piston 32 to be unable to go closer to the second rotating shaft 43-side than the third pawl portion 52.

Further, in a case where the liquid pressure in the oil chamber 37 is increased to increase a thrust force of the piston 32, friction forces increase between the friction plates 54, 55, and between the annular collar portion 45 and the friction plate on the annular collar portion 45-side approximately in proportion to the thrust force by which the synchronizer ring 51 is pushed against the second rotating shaft 43-side. Thereby, the torque to be transmitted to the synchronizer ring 51 becomes large and the force fy increases. Therefore, the force fx acting in a direction of pushing back the piston 32 also increases. As a result, in a state where the first rotating shaft 22 and the second rotating shaft 43 are not synchronized in rotation, it is possible for the piston 32 to be unable to go closer to the second rotating shaft 43-side than the third pawl portion 52. By adjusting the liquid pressure in the oil chamber 37 based upon this function, at the time the first rotating shaft 22 and the second rotating shaft 43 are synchronized in rotation, it is possible to control (adjust) the torque to be transmitted between the second rotating shaft 43 and the first rotating shaft 22. In addition, the piston 32 cannot go closer to the second rotating shaft 43-side than the third pawl portion 52 until the synchronization is completed. Therefore, it is possible to suppress the engagement between the first pawl portion 38 and the second pawl portion 47 before the first rotating shaft 22 and the second rotating shaft 43 are synchronized in rotation. Thereby, the shock torque can be suppressed.

Further, for preventing the piston 32 from being able to go closer to the second rotating shaft 43-side than the third pawl portion 52 in a state where the first rotating shaft 22 and the second rotating shaft 43 are not synchronized in rotation, an angle of α must be equal to or less than a predetermined position. The following Formula 4 is obtained by varying the above Formula 3.

$$\tan\alpha < \frac{fy}{fx} \qquad \text{[Formula 4]}$$

The following Formula 5 is obtained by substituting the above Formula 1 for the above Formula 2.

$$fy = \frac{F \times \mu \times N \times m}{L} \qquad \text{[Formula 5]}$$

The following Formula 6 is obtained by substituting the above Formula 4 for the above Formula 5.

$$\tan\alpha = \frac{F \times \mu \times N \times m}{fx \times L} \qquad \text{[Formula 6]}$$

"fx=F" is established while generating friction between surfaces of the friction plate 55 and the friction plate 54, and between the friction plate 55 and the second rotating shaft 43 for synchronization through the contact of the second rotating shaft 43 and the first rotating shaft 22 with the first inclination part 38A and the first inclination part 52A. As a result, the following Formula 7 is obtained.

$$\tan\alpha < \frac{\mu \times N \times m}{L} \qquad \text{[Formula 7]}$$

As an example, when μ=0, N=3, L=0.11 [m] and m=0.1 [m], α<15.25. However, when F is too large to fx, that is, a is too small, the first inclination part 38A and the first inclination part 52A are disengaged, and the synchronization between the first rotating shaft 22 and the second rotating shaft 43 becomes impossible. Therefore, a needs to be equal to or less than a predetermined value. Therefore, when the condition of the following Formula 8 is met, the first rotating shaft 22 and the second rotating shaft 43 are synchronized and then, the piston 32 can go closer to the second rotating shaft 43-side than the third pawl portion 52. As a result, it is possible to suppress the shock torque at the engagement of the power transmission device 21.

$$\alpha < \tan^{-1}\left(\frac{\mu \times N \times m}{L}\right) \qquad \text{[Formula 8]}$$

When the synchronization between the second rotating shaft 43 and the first rotating shaft 22 is completed, the torque T to be transmitted between the second rotating shaft 43 and the first rotating shaft 22 is reduced. Thereby, the torque T has a relation of the following Formula 9.

$$T < F \times \mu \times N \times m \quad \text{[Formula 9]}$$

Since the torque T to be transmitted to the synchronizer ring 51 becomes small, the force fy for rotating the first inclination part 38A of the first pawl portion 38 is reduced, and therefore, the force fx is reduced. In this state, a relation of the next Formula 10 is established.

$$fx = \frac{fy}{\tan \alpha} \quad \text{[Formula 10]}$$

Figure 6:
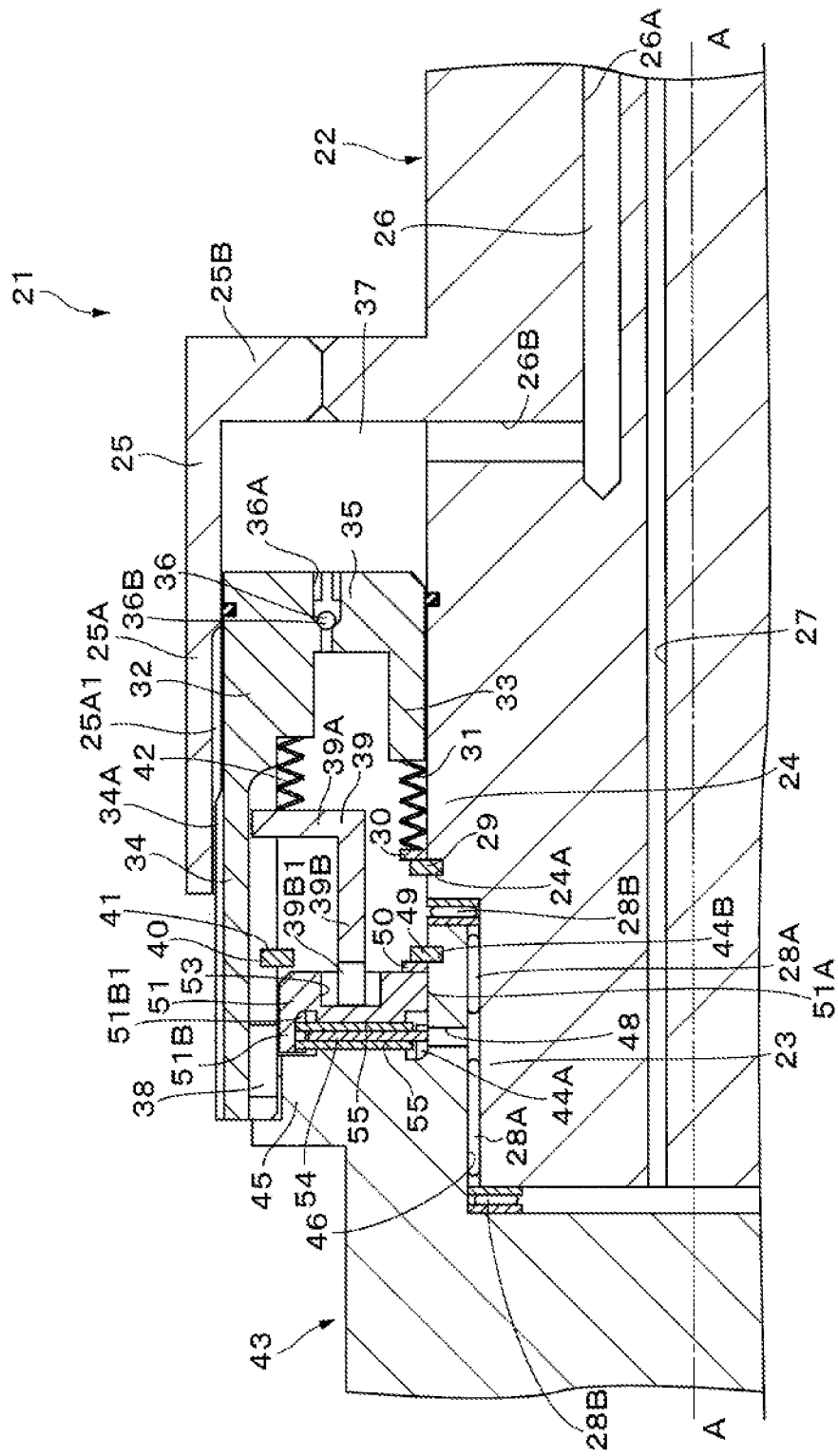
FIG. 6 is a longitudinal sectional view illustrating a state where the first pawl portion of the piston is engaged with a second pawl portion of a second rotating shaft in a position as similar to that in FIG. 3.
Figure 10:
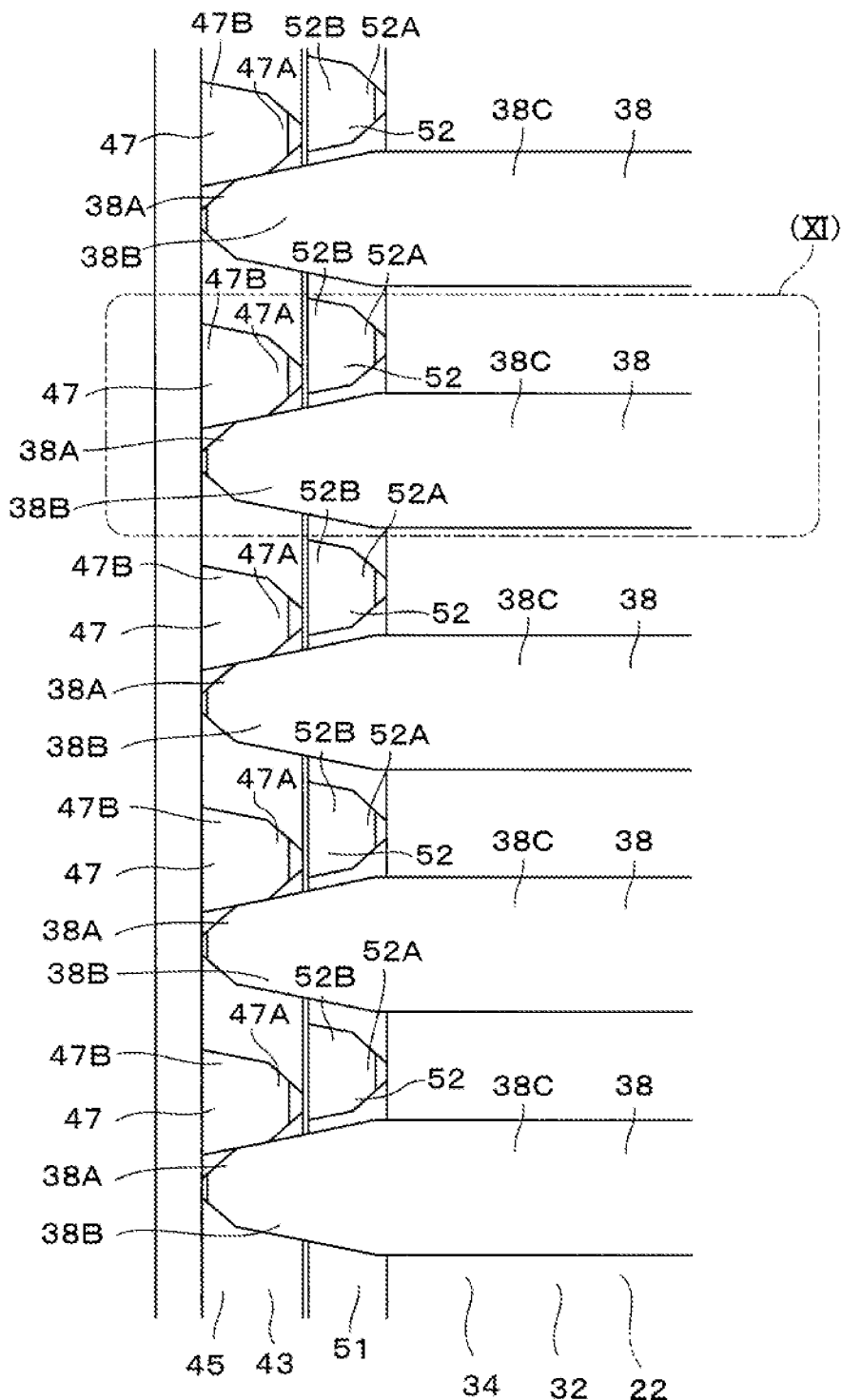
FIG. 10 is an explanatory diagram illustrating an example of a positional relation between the first pawl portion, the second pawl portion, and the third pawl portion in a state of the engagement between the first pawl portion and the second pawl portion.

When the torque T is reduced until the force fx becomes smaller than the force F (fx<F), the piston 32 can go closer to the second rotating shaft 43-side than the third pawl portion 52 of the synchronizer ring 51. That is, as illustrated in FIG. 6 and FIG. 10, the first pawl portion 38 of the piston 32 is engaged with the second pawl portion 47 of the second rotating shaft 43. At this time, as illustrated in FIG. 10 and FIG. 11, since the first inclination part 47A of the second pawl portion 47 is inclined toward the piston 32-side, the first pawl portion 38 of the piston 32 can be meshed (engaged) with the second pawl portion 47. Thereby, mechanical meshing joint is established between the second rotating shaft 43 and the first rotating shaft 22 to complete the engagement of the power transmission device 21. Here, FIG. 10 illustrates a contacting state between the first pawl portion 38 and the second pawl portion 47 at the engagement. FIG. 6 illustrates a longitudinal sectional surface (sectional surface including the center axis A-A).

Next, an explanation will be made of the connection state of the power transmission device 21, that is, a state of the engagement continuing time.

FIG. 11 illustrates forces generating in the second pawl portion 47 and the first pawl portion 38 when the power transmission device 21 is in the connection time. When the power transmission device 21 is in the connection time, the second inclination part 47B of the second pawl portion 47 is meshed (engaged) with the second inclination part 38B of the first pawl portion 38. At the time of this connection state, when transmitting torque is indicated at T2, a force for rotating the second inclination part 38B of the first pawl portion 38 is indicated at fy2, and a distance from the center axis A-A to an engagement point with the second inclination part 47B and the second inclination part 38B is indicated at L2, the force fy2 can be expressed by the next Formula 11.

$$fy2 = \frac{T2}{L2} \quad \text{[Formula 11]}$$

Since a meshing contact angle between the second inclination part 47B and the second inclination part 38B is inclined at an angle of β, a force fx2 is generated by a component force. At this time, a relation of the following Formula 12 is established between force fx2 and force fy2.

$$fx2 = \frac{fy2}{\tan \beta} \quad \text{[Formula 12]}$$

When the first pawl portion 38 is engaged with the second pawl portion 47, the piston 32 is pushed back by the force fx2. Therefore, the liquid pressure in the oil chamber 37 needs to be kept in a predetermined value (engagement maintaining predetermined value) so that the force F of the first pawl portion 38 is larger than the force fx2 (F>fx2) for maintaining the engagement between the first pawl portion 38 and the second pawl portion 47. That is, when the power transmission device 21 is in the connection state, the liquid pressure is delivered to the oil chamber 37 to keep the liquid pressure to be equal to or more than the predetermined value (engagement maintaining predetermined value), thereby, maintaining the engagement between the first pawl portion 38 and the second pawl portion 47.

Next, an explanation will be made of an operation of the power transmission device 21 at the time of switching the power transmission device 21 from the connection state (joint state) to the cutoff state (release state).

When the force F of the first pawl portion 38 is smaller than the force fx2 (F<fx2) by reducing the liquid pressure in the oil chamber 37 from the predetermined value, the piston 32 is pushed back to the first rotating shaft 22-side (the bottom part 25B-side of the cylinder portion 25), making it possible to undo the engagement (meshing) between the first pawl portion 38 and the second pawl portion 47. When the engagement between the first pawl portion 38 and the second pawl portion 47 is undone, the second inclination part 52B of the third pawl portion 52 is meshed with the second inclination part 38B of the first pawl portion 38. The engagement part (meshing part) between the third pawl portion 52 of the synchronizer ring 51 and the first pawl portion 38 of the piston 32 is also composed of the second inclination parts 52B, 38B and the first inclination parts 52A, 38A. Therefore, friction torque generates between the first friction plate 54 and the second friction plate 55, and between the annular collar portion 45 and the second friction plate 55 on the annular collar portion 45-side, thereby generating a force for pushing the first pawl portion 38 to the second rotating shaft 43-side. Therefore, the piston 32 can smoothly move to the bottom part 25B-side of the cylinder portion 25 in the first rotating shaft 22. At this time, the torque generating in the synchronizer ring 51 is made small. Therefore, the second inclination part 52B of the third pawl portion 52 may be formed as aside surface (parallel part) in parallel to the center line D-D.

Even when the engagement between the third pawl portion 52 and the first pawl portion 38 is undone, the engagement (meshing) between the key groove 53 of the synchronizer ring 51 and the projection 39B1 of the key ring 39 remains. The key ring 39 pushes the synchronizer ring 51 toward the second rotating shaft 43-side by the spring 42, but since the component force of the spring 42 is small, the friction torque generating between the first friction plate 54 and the second friction plate 55, and between the annular collar portion 45 and the second friction plate 55 on the annular collar portion 45-side is small. Therefore, a load by which the key groove 53 of the synchronizer ring 51 and the projection 39B1 of the key ring 39 is sufficiently small. Thereby, the key ring 39 and the piston 32 are further pushed back to the first rotating shaft 22-side (the bottom part 25B-side of the cylinder portion 25). Accordingly, even when the torque is transmitted between the second rotating shaft 43 and the first rotating shaft 22, the release between the second rotating shaft 43 and the first rotating shaft 22 is made possible. It should be noted that in a case where the torque is not transmitted between the second rotating shaft 43 and the first rotating shaft 22, since the component force necessary for pushing the piston 32 back to the first rotating shaft 22-side is made small, the release of the engagement between the pawl portions 38, 47, 52 is performed by the component force of the return spring 31 only.

As described above, according to the first embodiment, the first rotating shaft 22 and the second rotating shaft 43 are connected to be capable of transmitting the rotation by the first pawl portion 38 and the second pawl portion 47 being engaged to each other based upon the delivery of the hydraulic oil to the oil chamber 37. That is, the transmission of the rotation is performed between the first rotating shaft 22 and the second rotating shaft 43 by the engagement of the first pawl portion 38 and the second pawl portion 47. Therefore, as compared to the structure of performing the transmission of the rotation by the friction joint, since the number of parts sliding at the release time of the power transmission device 21 is reduced, the loss of the power can be reduced. Further, the engagement surfaces (the side surface 38B1 of the second inclination part 38B and the side surface 47B1 of the second inclination part 47B) are formed in inclination surfaces so that a force is applied to the first pawl portion 38 and the second pawl portion 47 in the direction of axially moving away from each other when the rotation is transmitted between the first rotating shaft 22 and the second rotating shaft 43. Therefore, even when large rotation is transmitted between the first rotating shaft 22 and the second rotating shaft 43, as the delivery of the hydraulic oil to the oil chamber 37 is stopped (the pressure to the oil chamber 37 is released), the engagement between the first pawl portion 38 and the second pawl portion 47 can be released based upon the force applied on the engagement surfaces between the first pawl portion 38 and the second pawl portion 47.

Further, when the first pawl portion 38 becomes engaged with the second pawl portion 47 of the second rotating shaft 43, the first pawl portion 38 is engaged with the third pawl portion 52 of the synchronizer ring 51 prior to the engagement with the second pawl portion 47. At this time, by pushing the synchronizer ring 51 toward the second rotating shaft 43 based upon the engagement of the first pawl portion 38 and the third pawl portion 52, the rotation of the first rotating shaft 22 can be synchronized with that of the second rotating shaft 43 based upon the friction force generating between the synchronizer ring 51 and the second rotating shaft 43. Therefore, the first pawl portion 38 can be engaged with the second pawl portion 47 in a state where the first rotating shaft 22 is synchronized with the second rotating shaft 43. Thereby, when the cutoff state (release state) where the transmission of the rotation between the first rotating shaft 22 and the second rotating shaft 43 is cut off is switched to the connection state where the transmission of the rotation is performed, the first rotating shaft 22 and the second rotating shaft 43 can stably be switched to a mechanical joint (engagement and meshing) through the joint by friction.

In addition, according to the first embodiment, the number of the sliding parts (sliding area) can be made small to reduce the heat generation and the loss of the power by the friction (sliding). Further, it is possible to reduce the delivery amount of the cooling liquid, and the loss can be reduced from this point as well. Furthermore, the torque at the time of performing the synchronization by friction can be made large. Energies absorbable at the synchronization also can be made large.

According to the first embodiment, the tip end-side engagement surface (side surface 38A1 of the first inclination part 38A) engaging with the third pawl portion 52 is disposed on the tip end side of the first pawl portion 38. Therefore, it is possible to stably push the synchronizer ring 51 toward the second rotating shaft 43 based upon the engagement between the tip end-side engagement surface (side surface 38A1 of the first inclination part 38A) of the first pawl portion 38 and the third pawl portion 52 (side surface 52A1 of the first inclination part 52A). Thereby, at the switching from the cutoff state (release state) to the connection state, it is possible to stably perform the synchronization in rotation between the first rotating shaft 22 and the second rotating shaft 43.

According to the first embodiment, the first engagement part (first inclination part 38A) of the first pawl portion 38 and the second engagement part (second inclination part 38B) are formed in the piston 32 as a single continuous pawl portion having the same inner diameter dimension. Therefore, as compared to the structure in which a first engagement part (the first inclination part 38A) as a part engaging with the third pawl portion 52 and a second engagement part (the second inclination part 38B) as a part engaging with the second pawl portion 47 (the second inclination part 47B thereof) are formed as different pawl portions in the piston 32, the processing operation can be facilitated.

According to the first embodiment, the piston 32 is provided with the key ring 39 engaging with the key groove 53 of the synchronizer ring 51 prior to the engagement between the first pawl portion 38 and the third pawl portion 52. Therefore, by the engagement between the projection 39B1 of the key ring 39 and the key groove 53 of the synchronizer ring 51, the first pawl portion 38 and the third pawl portion 52 can be engaged in a state where the rotation of the first rotating shaft 22 is synchronized with that of the synchronizer ring 51. Therefore, as compared with the structure in which the key ring 39 is not disposed, the shock torque at the engagement between the first pawl portion 38 and the third pawl portion 52 can be reduced.

According to the first embodiment, the friction plates 54, 55 are arranged between the synchronizer ring 51 and the second rotating shaft 43. Therefore, the friction area between the synchronizer ring 51 and the second rotating shaft 43 can be made large by the friction plates 54, 55 to increase the friction area between the synchronizer ring 51 and the second rotating shaft 43 and smoothly perform the synchronization in rotation of the first rotating shaft 22 and the second rotating shaft 43 for a short time. In addition, it is possible to suppress the heat generation at the time of synchronizing the rotation of the first rotating shaft 22 with that of the second rotating shaft 43.

Figure 12:
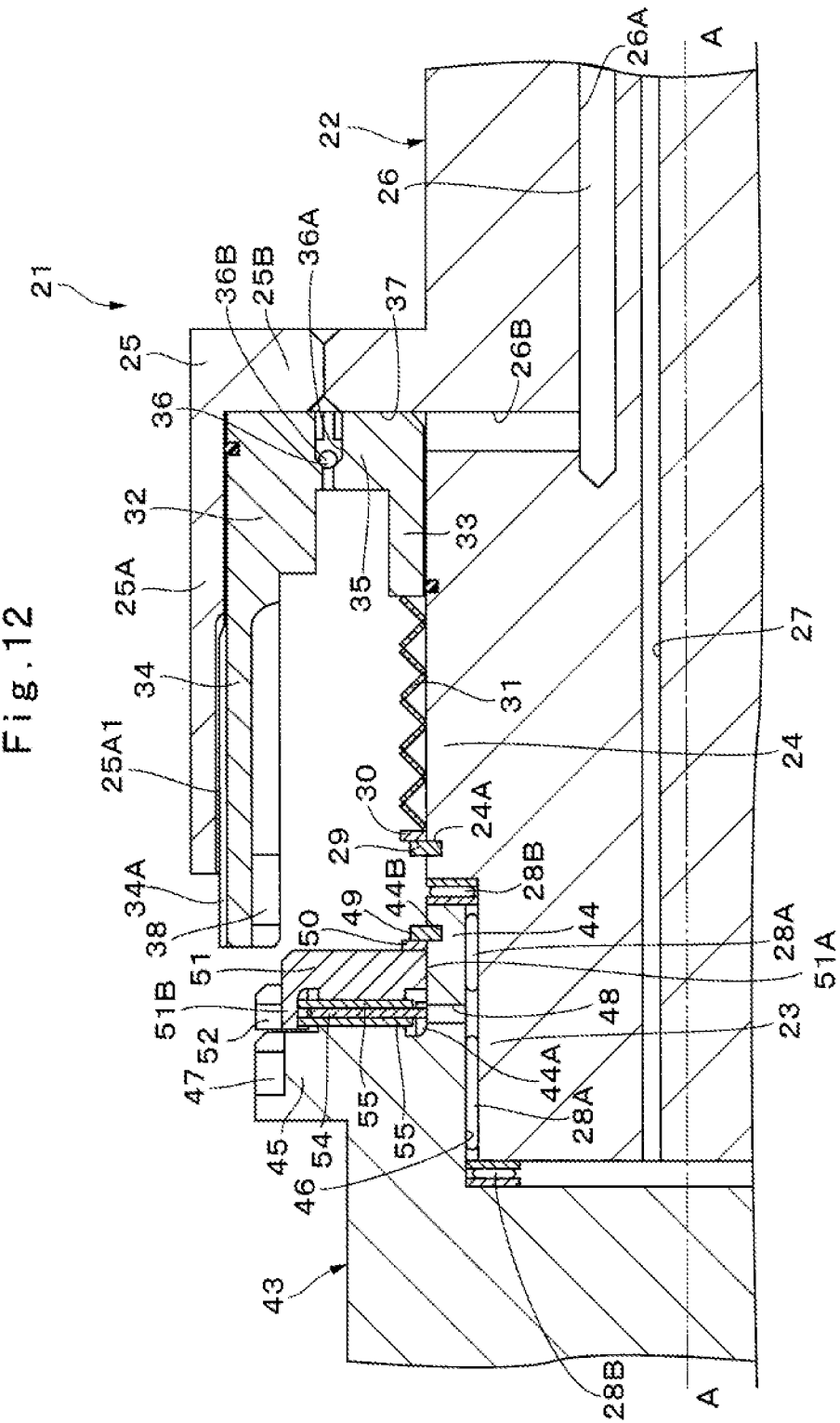
FIG. 12 is a longitudinal sectional view illustrating a power transmission device in a cutoff state where the transmission of the rotation is cut off according to a second embodiment.
Figure 13:
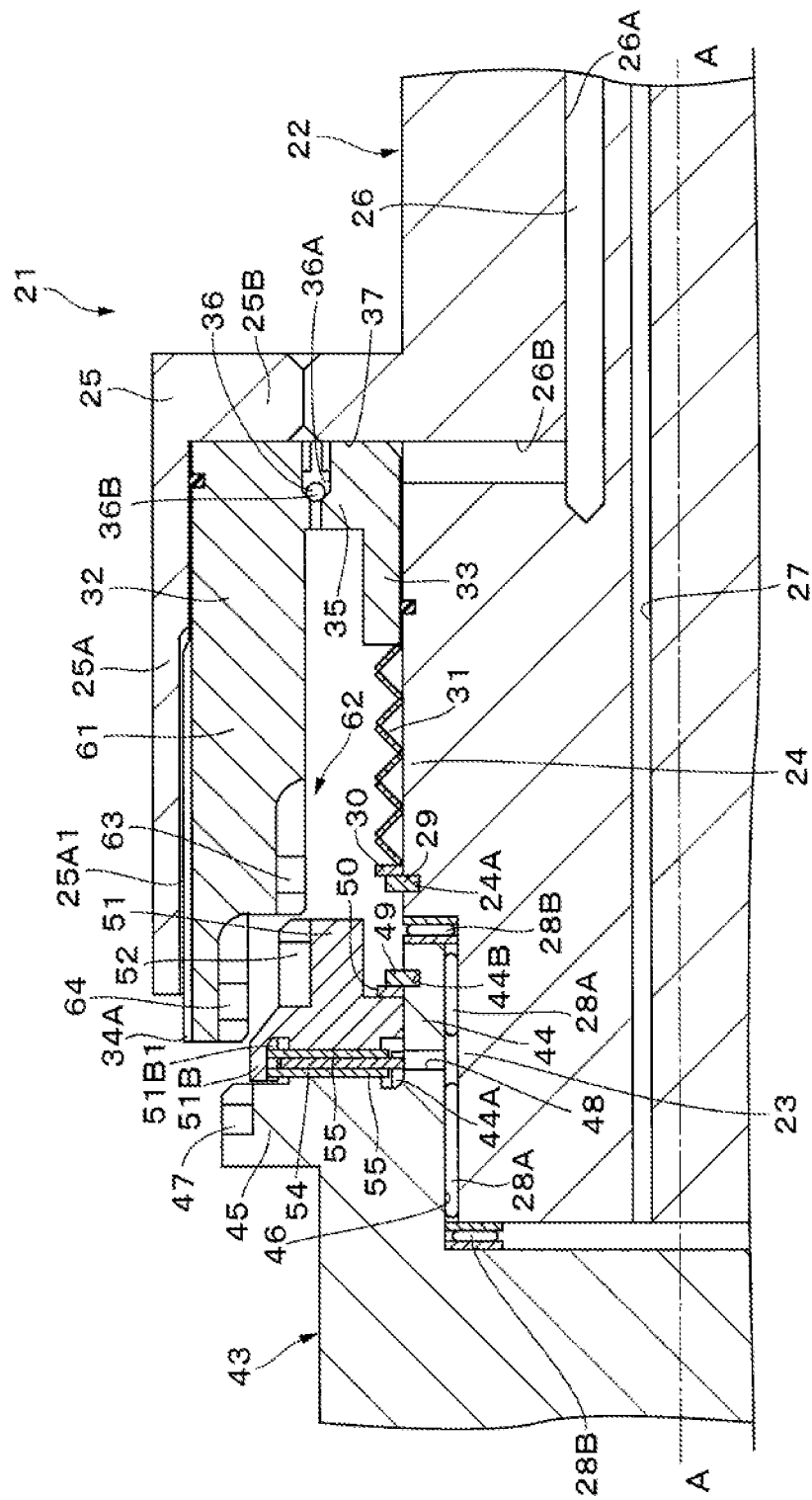
FIG. 13 is a longitudinal sectional view illustrating a power transmission device in a cutoff state where transmission of rotation is cut off according to a third embodiment.

Next, FIG. 12 illustrates a second embodiment. The second embodiment is characterized in that a key ring is not disposed. It should be noted that in the second embodiment, components identical to those in the first embodiment are referred to as identical reference numerals, and the explanation is omitted.

The second embodiment is configured so that the stop ring 40, the entire peripheral groove 41 and the key ring 39 are omitted from the piston 32 in the first embodiment. The key ring 39 in the first embodiment is a component for smooth contact between the first inclination part 38A of the first pawl portion 38 disposed on the inner peripheral side of the piston 32 and the first inclination part 52A of the third pawl portion 52 disposed on the outer peripheral side of the synchronizer ring 51. Smoothness of the contact deteriorates, but the key ring 39 may be omitted. Without the key ring 39, the stop ring 40 and the entire peripheral groove 41, the number of the components and the processing steps can be reduced to simplify the power transmission device 21.

The second embodiment is, as described above, configured by omitting the stop ring, the entire peripheral groove and the key ring, and the basic operation is not particularly different from that of the above-mentioned first embodiment. Particularly according to the second embodiment, costs can be reduced corresponding to omittance of the stop ring, the entire peripheral groove and the key ring.

Next, FIG. 13 to FIG. 16 illustrate a third embodiment. The third embodiment is characterized in that a key ring is omitted, and a first engagement part and a second engagement part of a first pawl portion are formed as different pawl portions having different inner diameter dimensions in the piston. It should be noted that in the third embodiment, components identical to those in the first embodiment and in the second embodiment are referred to as identical reference numerals, and the explanation is omitted.

The piston 32 is provided with an inner diameter-side cylindrical part 33, an outer diameter-side cylindrical part 61 and a joint part 35. A first pawl portion 62 is formed on the inner peripheral side of the outer diameter-side cylindrical part 61. The first pawl portion 62 is provided with a first engagement part (hereinafter, referred to as an inside first pawl portion 63) as a part engaging with the third pawl portion 52, and a second engagement part (hereinafter, referred to as an outside first pawl portion 64) as a part engaging with the second pawl portion 47. The inside first pawl portion 63 and the outside first pawl portion 64 are formed as different pawl portions having different inner diameter dimensions in the piston 32.

In this way, in the third embodiment, the inside first pawl portion 63 and the outside first pawl portion 64 are coaxially arranged on the inner peripheral side of the piston 32. The inside first pawl portion 63 is engaged with the third pawl portion 52 installed on the outer peripheral side of the synchronizer ring 51. The outside first pawl portion 64 is engaged with the second pawl portion 47 installed on the outer peripheral side of the second rotating shaft 43.

Figure 14:
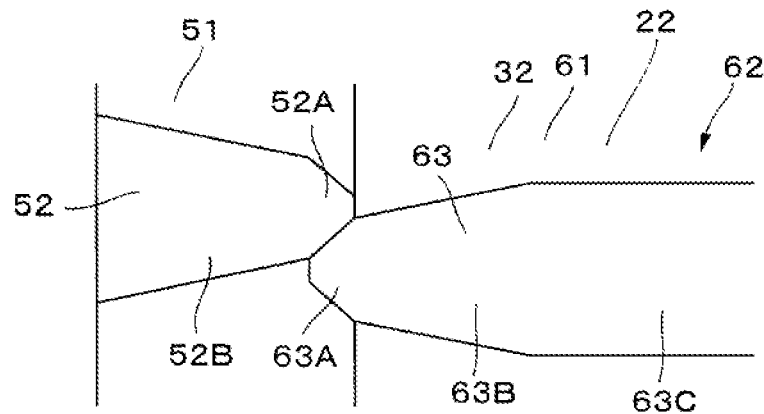
FIG. 14 is an explanatory diagram illustrating a state where a first engagement part (inside first pawl portion) of the first pawl portion starts to be engaged with the third pawl portion of the synchronizer ring.
Figure 15:
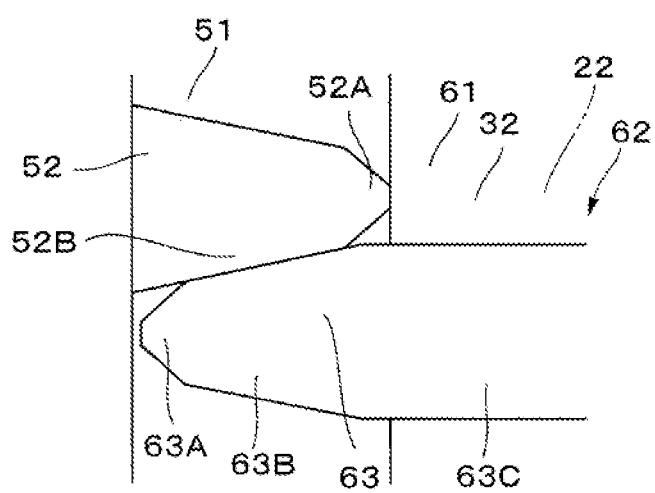
FIG. 15 is an explanatory diagram illustrating a state where a first engagement part (inside first pawl portion) of the first pawl portion is engaged with the third pawl portion of the synchronizer ring.
Figure 16:
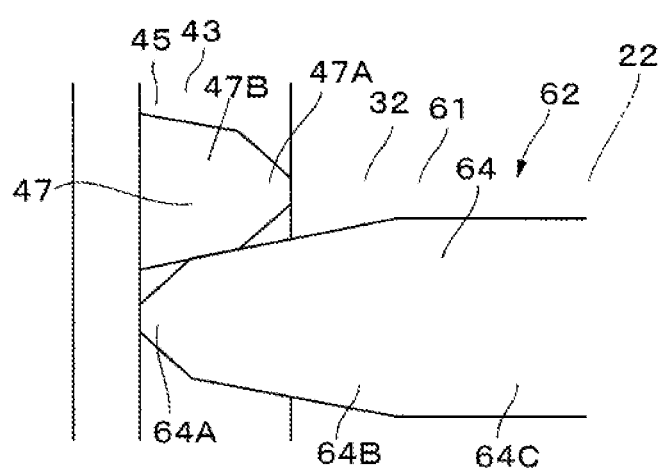
FIG. 16 is an explanatory diagram illustrating a state where a second engagement part (outside first pawl portion) of the first pawl portion is engaged with the second pawl portion of the second rotating shaft.

As illustrated in FIG. 14 and FIG. 15, the inside first pawl portion 63 of the piston 32 has an angle of the side surface varying by three steps, and the inside first pawl portion 63 is provided with a first inclination part 63A as an obtuse angle, a second inclination part 63B as an acute angle and a parallel part 63C in order from the tip end side of the inside first pawl portion 63. In contrast, the third pawl portion 52 of the synchronizer ring 51 has an angle of the side surface varying by two steps, and the third pawl portion 52 is provided with the first inclination part 52A as an obtuse angle and the second inclination part 52B as an acute angle in order from the tip end side of the third pawl portion 52. On the other hand, as illustrated in FIG. 16, an outside first pawl portion 64 of the piston 32 has an angle of the side surface varying by three steps, and the outside first pawl portion 64 is provided with a first inclination part 64A as an obtuse angle, a second inclination part 64B as an acute angle and a parallel part 64C in order from the tip end side of the outside first pawl portion 64. On the other hand, the second pawl portion 47 of the second rotating shaft 43 has an angle of the side surface varying by two steps, and the second pawl portion 47 is provided with the first inclination part 47A as an obtuse angle and the second inclination part 47B as an acute angle in order from the tip end side of the second pawl portion 47.

Here, As illustrated in FIG. 16, it is preferable that the outside first pawl portion 64 and the second pawl portion 47 are small, a circumferential interval thereof is narrow and the number thereof is large. This is because by making circumferential (rotational direction) looseness at the meshing of the pawl portions 64, 47 small, it is possible to make the torque shock small, which will generate in a case where a transmission direction of the torque is reversed. On the other hand, as illustrated in FIG. 14 and FIG. 15, it is preferable that the inside first pawl portion 63 and the third pawl portion 52 are large, a circumferential interval thereof is large and the number thereof is small. As a result, it is possible to smoothly make contact between the first inclination part 64A of the inside first pawl portion 63 and the first inclination part 52A of the third pawl portion 52. In this way, by arranging the two pawl portions 63, 64 of the inside first pawl portion 63 and the outside first pawl portion 64 in the piston 32, the shock torque can be reduced and the engagement of the pawl portions 47, 52, 63, 64 can smoothly be performed.

The third embodiment is, as described above, configured to arrange the inside first pawl portion 63 and the outside first pawl portion 64 in the piston 32, and the basic operation is not particularly different from that of the first embodiment and the second embodiment.

Particularly, according to the third embodiment, a first engagement part (the inside first pawl portion 63) and a second engagement part (the outside first pawl portion 64) of the first pawl portion 62 are formed as different pawl portions 63, 64 having different inner diameter dimensions in the piston 32. Therefore, the number of pawl portions, an interval between a pawl portion and a pawl portion, a thickness dimension of a pawl portion and the like can be made different between the first engagement part (the inside first pawl portion 63) and the second engagement part (the outside first pawl portion 64). Thereby, it is possible to smoothly perform each engagement at the time of the engagement of the first pawl portion 62 (the inside first pawl portion 63 and the outside first pawl portion 64) with the second pawl portion 47 and with the third pawl portion 52 both.

Figure 17:
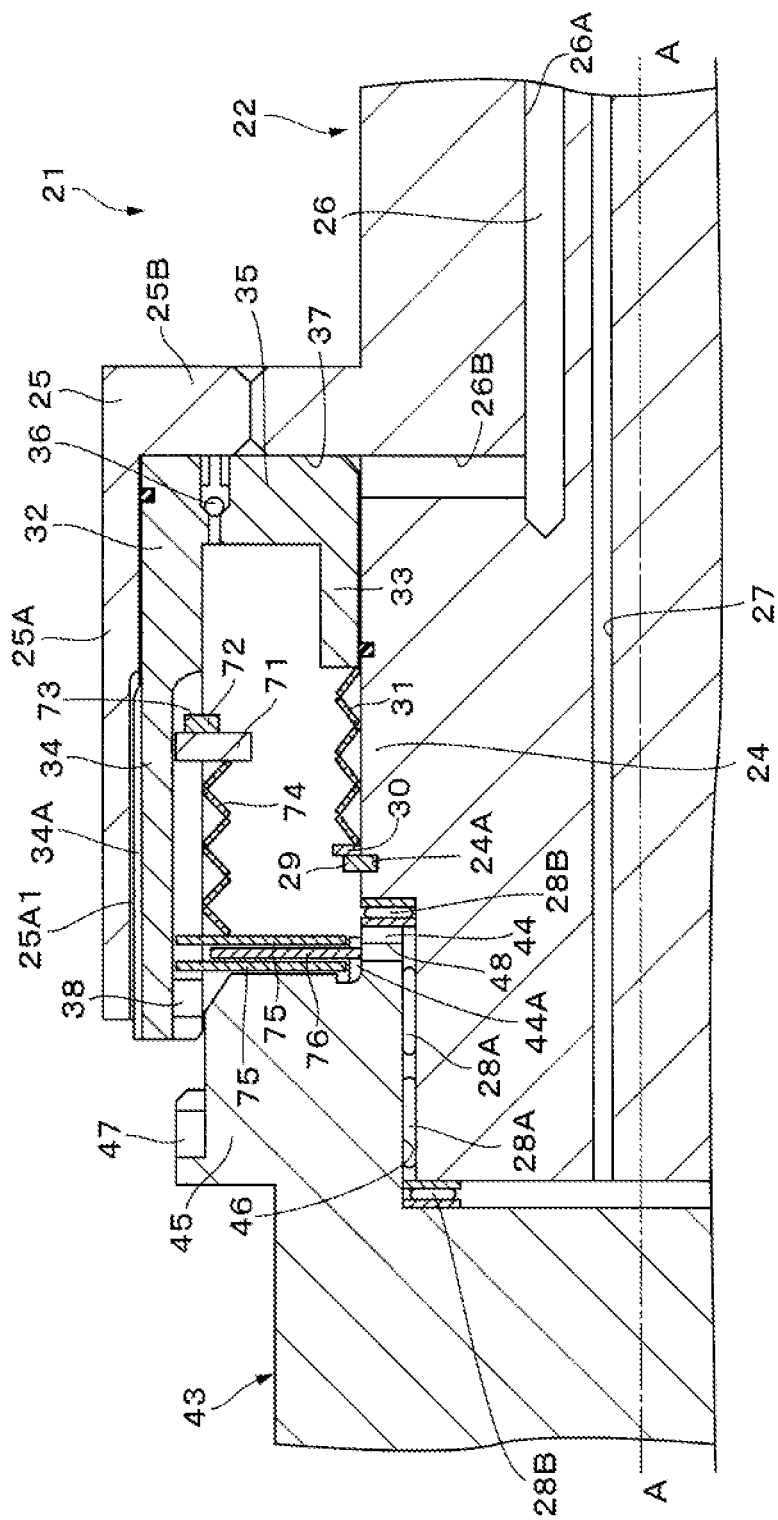
FIG. 17 is a longitudinal sectional view illustrating a power transmission device in a cutoff state where the transmission of rotation is cut off according to a forth first embodiment.

Next, FIG. 17 illustrates a fourth embodiment. The fourth embodiment is characterized in that a synchronizer ring is omitted. It should be noted that in the fourth embodiment, components identical to those in the first to third embodiments are referred to as identical reference numerals, and the explanation is omitted.

The power transmission device 21 according to the fourth embodiment is provided with the first rotating shaft 22, the piston 32, the oil chamber 37, the first rotating shaft-side friction plate 75, the second rotating shaft 43 and the second rotating shaft-side friction plate 76. The power transmission device 21 according to the fourth embodiment is not provided with a synchronizer ring. Therefore, the power transmission device 21 according to the fourth embodiment is simply configured. An annular push plate 71 is disposed on the inner peripheral side of the outer diameter-side cylindrical part 34 in the piston 32. In this case, the push plate 71 is arranged to be coaxial with the piston 32. A plurality of concave parts (unillustrated) are arranged to be separated in the circumferential direction on an outer peripheral side of the push plate 71. The concave parts of the push plate 71 are engaged with the first pawl portion 38 of the piston 32. As a result, the piston 32 and the push plate 71 are restricted in a rotational direction. An entire peripheral groove 73 for a stop ring 72 to be installed is disposed on the inner peripheral side of the outer diameter-side cylindrical part 34 (in other words, the first pawl portion 38). The stop ring 72 blocks an axial movement of the push plate 71 to the joint part 35-side of the piston 32. A spring 74, a first rotating shaft-side friction plate 75 and a second rotating shaft-side friction plate 76 are installed between the push plate 71 and the annular collar portion 45 of the second rotating shaft 43.

The first rotating shaft-side friction plate 75 is all the time meshed with the first pawl portion 38 of the piston 32. In this case, concave parts are arranged to be engaged with the first pawl portion 38 on an outer peripheral side of the first rotating shaft-side friction plate 75. The first rotating shaft-side friction plate 75 is attached to the piston 32 in a state to be capable of moving in the axial direction to the piston 32 and to block a circumferential (rotational direction) movement to the piston 32 by the engagement between the concave parts and the first pawl portions 38. That is, the first rotating shaft-side friction plate 75 is supported to the piston 32 in a state of being coaxial with the piston 32 and relative rotation to the piston being blocked. The first rotating shaft-side friction plate 75 is, when the spring 74 is elastically deformed (contracts) following the movement of the piston 32 to the second rotating shaft 43-side, urged to the annular collar portion 45-side of the second rotating shaft 43 by the spring 74. When the piston 32 is returned back to the bottom part 25B-side of the cylinder portion 25, the spring 74 becomes in a free state and a clearance is formed between the first rotating shaft-side friction plate 75 and the second rotating shaft-side friction plate 76.

The second rotating shaft-side friction plate 76 is all the time meshed with the convex parts 44A of the second rotating shaft 43. In this case, concave parts are arranged to be engaged with the convex parts 44A disposed in the small diameter portion 44 of the second rotating shaft 43 on the inner peripheral side of the second rotating shaft-side friction plate 76. The second rotating shaft-side friction plate 76 is attached to the second rotating shaft 43 in a state to be capable of performing an axial movement relative to the second rotating shaft 43 and block a circumferential (rotational direction) movement relative to the second rotating shaft 43 by the engagement between the concave parts and the convex parts 44A. That is, the second rotating shaft-side friction plate 76 is supported on the second rotating shaft 43 in a state of being coaxial to the second rotating shaft 43 and of relative rotation to the second rotating shaft 43 being blocked.

In the fourth embodiment as described above, when the first pawl portion 38 of the piston 32 and the second pawl portion 47 of the second rotating shaft 43 are engaged based upon the delivery of the hydraulic oil to the oil chamber 37, the first rotating shaft-side friction plate 75 makes frictional contact with the second rotating shaft-side friction plate 76 prior to the engagement between the first pawl portions 38 and the second pawl portions 47. Together with this, the annular collar portion 45 of the second rotating shaft 43 and the first rotating shaft-side friction plate 75 also make frictional contact with each other. In addition, in the fourth embodiment as well, as similar to the first embodiment, the engagement surfaces (the side surface 38B1 of the second inclination part 38B and the side surface 47B1 of the second inclination part 47B) of the first pawl portions 38 and the second pawl portions 47 are formed as inclination surfaces so that a force is applied to the first pawl portion 38 and the second pawl portion 47 in the direction of axially moving away from each other when the rotation is transmitted between the first rotating shaft 22 and the second rotating shaft 43.

Next, an explanation will be made of an operation at the time of connecting the power transmission device 21, that is, from the cutoff state where the transmission of the rotation is cut off between the first rotating shaft 22 and the second rotating shaft 43 to a state where the transmission of the rotation is made possible between the first rotating shaft 22 and the second rotating shaft 43.

When the piston 32 is moved to the second rotating shaft 43-side by the delivery of the hydraulic oil to the oil chamber 37, the push plate 71 causes the first rotating shaft-side friction plate 75 and the second rotating shaft-side friction plate 76 to slide through the spring 74. Thereby, torque in a direction of synchronizing the first rotating shaft 22 and the second rotating shaft 43 in terms of rotation is applied thereto. At this time, by adjusting the liquid pressure in the oil chamber 37 to be equal to or less than a predetermined value (synchronization predetermined value), the first pawl portion 38 of the piston 32 and the second pawl portion 47 of the second rotating shaft 43 are caused to make no contact to each other. When the synchronization of the first rotating shaft 22 and the second rotating shaft 43 in terms of rotation is completed, the liquid pressure in the oil chamber 37 is increased to more than the predetermined value (synchronization predetermined value) to further move the piston 32 to the second rotating shaft 43-side. Thereby, the second inclination part 38B of the first pawl portion 38 is engaged with the second inclination part 47B of the second pawl portion 47. At this time, since both a first inclination part 38A as a tip end of the first pawl portion 38 and a first inclination part 47A as a tip end of the second pawl portion 47 are arranged to have an obtuse angle, the engagement between the first pawl portion 38 and the second pawl portion 47 can start smoothly. Whether or not the synchronization between the first rotating shaft 22 and the second rotating shaft 43 is completed can be determined, for example, by detecting a difference in a rotational speed between the first rotating shaft 22 and the second rotating shaft 43 by a rotational sensor. In addition, it may be assumed that the synchronization is completed after an elapse of a predetermined time.

That is, in the fourth embodiment, the push plate 71 causes the first rotating shaft-side friction plate 75 and the second rotating shaft-side friction plate 76 to push to each other through the spring 74 by a thrust force generated in the piston 32 based upon the delivery of the hydraulic oil to the oil chamber 37. Here, a liquid pressure (pressure) by which the first pawl portion 38 of the piston 32 and the second pawl portion 47 of the second rotating shaft 43 do not make contact (engage) to each other is defined as a first liquid pressure (for example, a synchronization predetermined value). A liquid pressure (pressure) by which the first pawl portion 38 of the piston 32 and the second pawl portion 47 of the second rotating shaft 43 can make contact (engage) to each other is defined as a second liquid pressure (for example, an engagement predetermined value). A liquid pressure delivery source (hydraulic source) delivering hydraulic oil to the oil chamber 37 changes the liquid pressure in the oil chamber 37 from the first liquid pressure to the second liquid pressure when a relative rotating speed between the first rotating shaft 22 and the second rotating shaft 43 is equal to or less than a predetermined value (that is, equal to or less than the relative rotating speed assumed as synchronized). It should be noted that the liquid pressure delivery source changes the liquid pressure in the oil chamber 37 from the first liquid pressure to the second liquid pressure after holding the liquid pressure in the oil chamber 37 to the first liquid pressure for a predetermined time (for example, a time assumed as predetermined and synchronized).

Next, an explanation will be made of an operation at the time of releasing the connection of the power transmission device 21.

In a state where the power transmission device 21 is connected, the second inclination part 38B of the first pawl portion 38 is engaged with the second inclination part 47B of the second pawl portion 47. In this case, the engagement surfaces (the side surface 38B1 of the second inclination part 38B and the side surface 47B1 of the second inclination part 47B) have an obtuse angle, a force in a direction of pushing back the piston 32 is applied to the piston 32 by the transmission of the torque between the first rotating shaft 22 and the second rotating shaft 43. When the liquid pressure in the oil chamber 37 is held to a predetermined value or more (engagement holding predetermined value or more), the piston 32 is not pushed back. On the other hand, when the liquid pressure in the oil chamber 37 is lowered to less than the predetermined value (engagement holding predetermined value), the piston 32 is pushed back to the first rotating shaft 22-side (the bottom part 25B-side of the cylinder portion 25), thus making it possible to undo the engagement between the first pawl portion 38 and the second pawl portion 47.

As a result, even in a case where the transmission of the torque is performed between the second rotating shaft 43 and the first rotating shaft 22, the release between the second rotating shaft 43 and the first rotating shaft 22 is made possible. When the engagement between the first pawl portion 38 and the second pawl portion 47 is undone, the piston 32 is further pushed back to the first rotating shaft 22-side (the bottom part 25B-side of the cylinder portion 25) by the return spring 31. As a result, the release between the second rotating shaft 43 and the first rotating shaft 22 is completed. It should be noted that in a case where the torque is not transmitted between the second rotating shaft 43 and the first rotating shaft 22, since the thrust force necessary for pushing back the piston 32 to the first rotating shaft 22-side is made small, the engagement between the first pawl portion 38 and the second pawl portion 47 can be undone by the return spring 31.

The fourth embodiment is, as described above, configured not to dispose the synchronizer ring, and the basic operation is not particularly different from that of the first embodiment to the third embodiment.

Particularly, according to the fourth embodiment as described above, when the first pawl portion 38 and the second pawl portion 47 are engaged, the first rotating shaft-side friction plate 75 makes frictional contact with the second rotating shaft-side friction plate 76 prior to the engagement between the first pawl portion 38 and the second pawl portion 47. In addition, a side surface of the annular collar portion 45 of the second rotating shaft 43, that is, the side surface on the piston 32-side and the first rotating shaft-side friction plate 75 also make frictional contact with each other. Thereby, based upon friction forces generating between the first rotating shaft-side friction plate 75 and the second rotating shaft-side friction plate 76, and between the first rotating shaft-side friction plate 75 and the side surface of the second rotating shaft 43 on the piston 32-side, the rotation of the first rotating shaft 22 and the rotation of the second rotating shaft 43 can be synchronized. Therefore, in a state where the first rotating shaft 22 and the second rotating shaft 43 are synchronized, it is possible to engage the first pawl portion 38 with the second pawl portion 47. Thereby, at the switching from the cutoff state (release state) where the transmission of the rotation is cut off between the first rotating shaft 22 and the second rotating shaft 43 to the connection state where the transmission of the rotation is performed, it is possible to be stably switched to mechanical joint (engagement and meshing) through friction.

Figure 18:
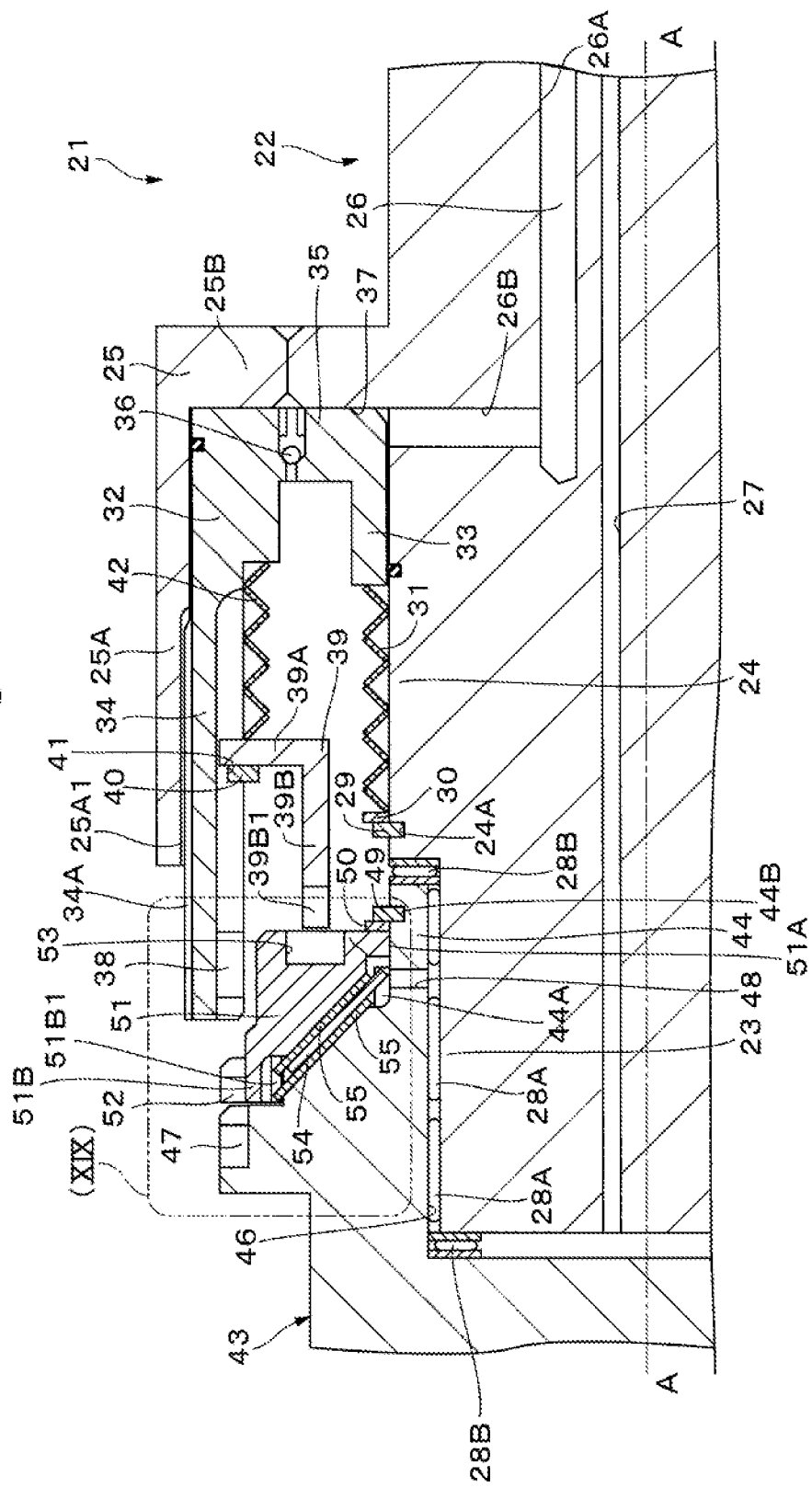
FIG. 18 is a longitudinal sectional view illustrating a power transmission device in a cutoff state where the transmission of rotation is cut off according to a fifth embodiment.
Figure 19:
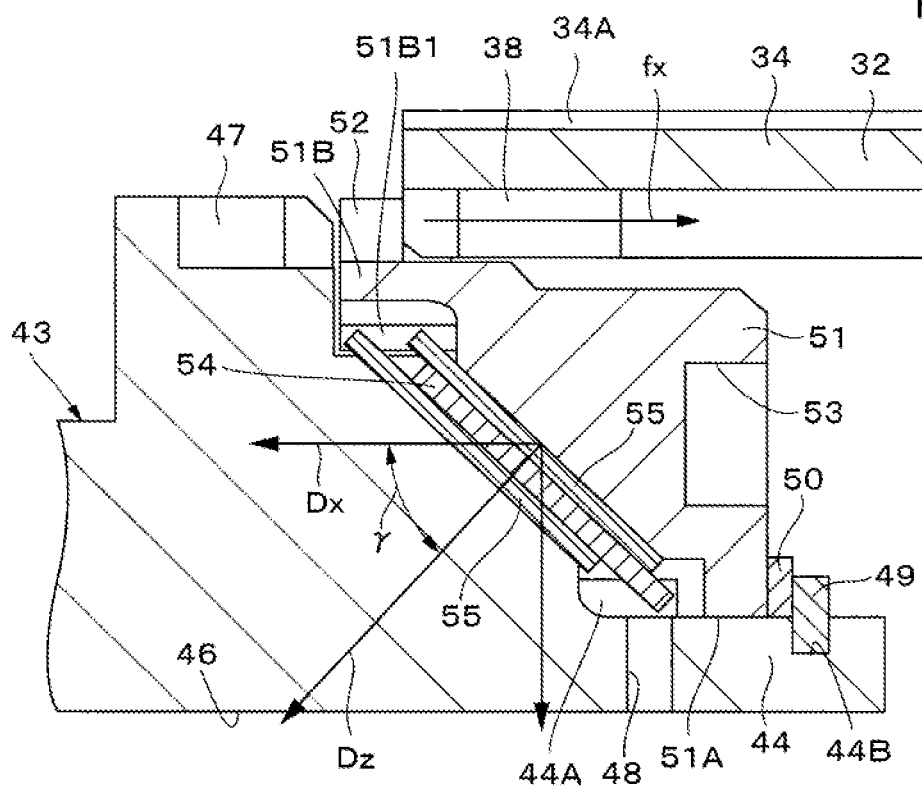
FIG. 19 is an enlarged view illustrating an (XIX) part in FIG. 18.
Figure 20:
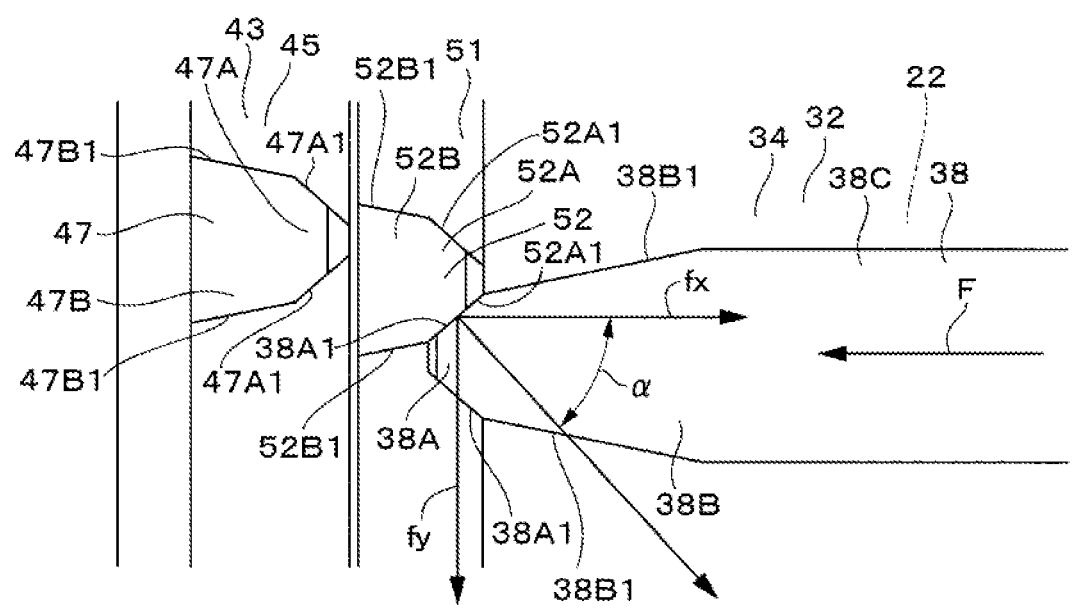
FIG. 20 is an explanatory diagram illustrating a state of the engagement between the first pawl portion and the third pawl portion.

Next, FIG. 18 to FIG. 20 illustrate a fifth embodiment. The fifth embodiment is characterized in that a friction surface of a friction plate is inclined. It should be noted that in the fifth embodiment, components identical to those in the first to fourth embodiments are referred to as identical reference numerals, and the explanation is omitted.

In the first to third embodiment as described above, the friction surfaces of the friction plates 54, 55 are perpendicular to the center axis A-A of the first rotating shaft 22 and the second rotating shaft 43. On the other hand, in the fifth embodiment, a friction surface of a friction plate is inclined in the center axis A-A direction. Specifically, in the fifth embodiment the friction plates 54, 55 in the first embodiment are inclined in the center axis A-A direction. It should be noted that the friction plates 54, 55 in the second embodiment and in the third embodiment may be inclined in the center axis A-A direction.

In the fifth embodiment also, as similar to the first embodiment, the first friction plate 54 and the second friction plate 55 are arranged between the synchronizer ring 51 and the second rotating shaft 43 In the fifth embodiment, the friction plates 54, 55 are inclined in such a direction that the outer peripheral side is closer to the second rotating shaft 43 than the inner peripheral side (in a direction of moving away from the piston 32).

Next, an explanation will be made of an operation at the time of connecting the power transmission device 21.

When the hydraulic oil is delivered to the oil chamber 37 and the piston 32 is moved to the second rotating shaft 43-side, the projection 39B1 of the key ring 39 is engaged with the key groove 53 of the synchronizer ring 51. Thereby, the synchronizer ring 51 and piston 32 start to rotate integrally. When the piston 32 is further moved to the second rotating shaft 43-side, the first inclination part 38A of the first pawl portion 38 disposed in the piston 32 makes contact with the first inclination part 52A of the third pawl portion 52 disposed in the synchronizer ring 51. FIG. 20 illustrates a contact state between the first pawl portion 38 and the third pawl portion 52. The first inclination part 38A of the first pawl portion 38 axially presses the first inclination part 52A of the third pawl portion 52 by a force F. As illustrated in FIG. 19, the force F is transmitted via the third pawl portion 52 to the synchronizer ring 51 and horizontally (axially) pushes the friction plates 54, 55 by a force $D_x$. At this time, a relation of "$F=D_x$" is established. Here, since the friction plates 54, 55 are inclined in the center axis A-A direction, the friction plates 54, 55 are pushed by a force Dz in a direction perpendicular to the friction plates 54, 55. When an angle between force Dx and force Dz is indicated at an angle γ, a relation of the next Formula 13 is established.

$$D_z = \frac{Dx}{\cos(\gamma)} \quad \text{[Formula 13]}$$

Thereby, When γ is larger than 0 (γ>0), the force $D_z$ is larger than the force $D_x$ ($D_z>D_x$) Torque T which is applied to each of the first rotating shaft 22 and the second rotating shaft 43 in a direction of synchronizing them in rotation, wherein a friction coefficient is indicated at μ, the number of friction surfaces is indicated at N and an effective friction radius is indicated at m, can be expressed by the next Formula 14.

$$T=D_z \times \mu \times N \times m \quad \text{(Formula 14)}$$

As described above, when the friction plates 54, 55 are inclined in the center axis A-A direction, there is generated an effect that the torque T to the force $D_x$ becomes large. As illustrated in FIG. 20, the torque T transmitted to the synchronizer ring 51 generates the force fy which will rotate the first inclination part 38A of the first pawl portion 38 through the first inclination part 52A of the third pawl portion 52. The force fy can be expressed according to the above-mentioned Formula 2 in a case where the torque is indicated at T, and a distance from the center axis A-A to an engagement point between the first inclination part 52A and the first inclination part 38A is indicated at L.

The contact between the first inclination part 52A and the first inclination part 38A generates the force fx as a component force because of being inclined at an angle $\alpha$. At this time, between the force fx and the force fy, a relation of the above-mentioned Formula 3 is established. Thereby, the piston 32 is pushed back to the bottom part 25B-side of the cylinder portion 25 by the force fx. Based upon this function, when the force fx is set to the force F or more (fx≠F), in a state where the first rotating shaft 22 and the second rotating shaft 43 are not synchronized in rotation, the piston 32 cannot move closer to the second rotating shaft 43-side than the third pawl portion 52. When the friction plates 54, 55 are inclined in the center axis A-A direction, since the force fx to the force F can be made large, in a state where the first rotating shaft 22 and the second rotating shaft 43 are not synchronized in rotation, it is possible to easily prevent the piston 32 from moving closer to the second rotating shaft 43-side than the third pawl portion 52.

Figure 21:
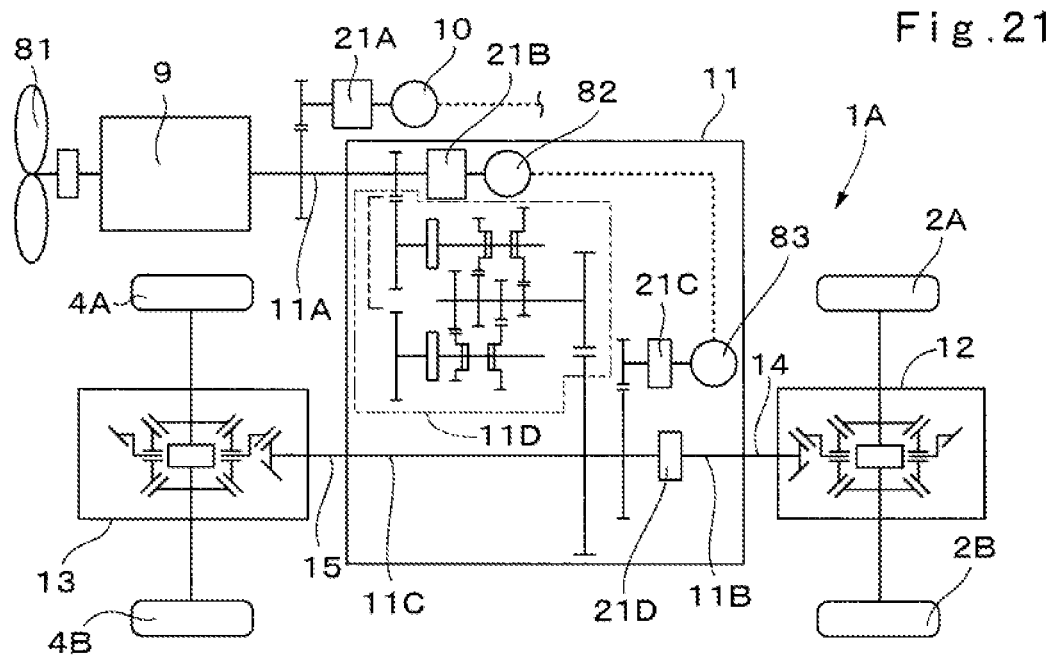
FIG. 21 is a structure diagram illustrating an example of a power transmission path of a wheel loader.
Figure 22:
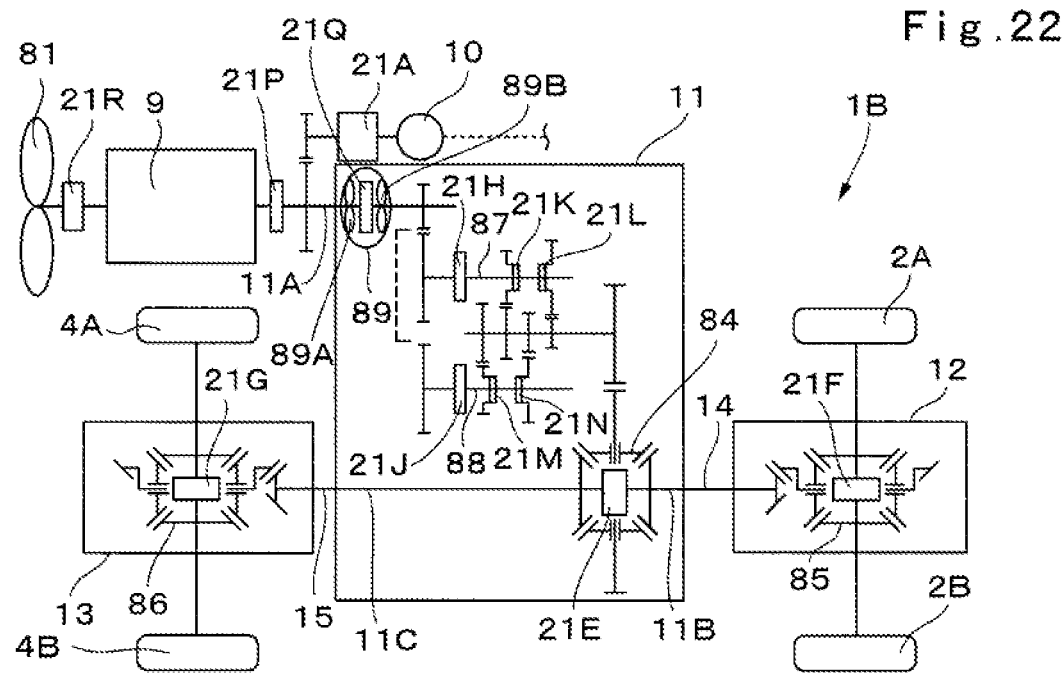
FIG. 22 is a structure diagram illustrating another example of a power transmission path of the wheel loader.

Next, an explanation will be made of portions, on which the power transmission device 21 according to each of the first to fifth embodiments is disposed, with reference to FIG. 21 and FIG. 22. FIG. 21 and FIG. 22 illustrate power transmission paths of wheel loaders 1A, 1B as working vehicles. The wheel loader 1A illustrated in FIG. 21 differs in the structure of the speed change gear 11 from the wheel loader 1B illustrated in FIG. 22. Moreover, Power transmission devices 21A, 21B, 21C, 21D in FIG. 21 and power transmission devices 21E, 21F, 21G, 21H, 21J, 21K, 21L, 21M, 21N, 21P, 21Q and 21R in FIG. 22 correspond to the power transmission devices 21 in the embodiments respectively.

In FIG. 21 and FIG. 22, a cooling fan 81, the hydraulic pump 10 and the speed change gear 11 are connected to the engine 9 as a power source (prime mover). The hydraulic pump 10 delivers hydraulic oil for operating the working mechanism 7 also as a cargo handling machine. The speed change gear 11 transmits power supplied from the engine 9 to the front axle 12 and the rear axle 13. The power transmitted to the front axle 12 is distributed to the left front wheel 2A and the right front wheel 2B. Similarly the power transmitted to the rear axle 13 is distributed to the left rear wheel 4A and the right rear wheel 4B.

In FIG. 21, the power transmission device 21A is disposed between the engine 9 as a driving member (drive source) and the hydraulic pump 10 as a driven member. Specifically the power transmission device 21A is disposed between an element (for example, a transmission shaft) connected to the engine 9 and an element (for example, an input shaft) of the hydraulic pump 10. In this case, one of the first rotating shaft 22 and the second rotating shaft 43 is connected to the element connected to the engine 9 and the other is connected to the element of the hydraulic pump 10. When the wheel loader 1A is stopped or when the wheel loader 1A is traveling at high speeds, since it is not necessary to operate the working mechanism 7, the power transmission device 21A is set to the cutoff state (release state) and thereby, the hydraulic pump 10 is mechanically separated from the engine 9. Thereby, the load of the engine 9 is reduced, making it possible to reduce consumption of power. The power transmission device 21A can perform the synchronization for a short time since the torque at the time of performing the synchronization is large. In addition thereto, also at the time of performing the transmission of the torque at the power transmission device 21A, the release of the power transmission device 21A is made possible. Therefore, it is appropriate to dispose the power transmission device 21A in the embodiment between the engine 9 and the hydraulic pump 10.

In FIG. 21, the power transmission device 21B is disposed between the engine 9 and a hydraulic pump 82 in the speed change gear 11. Specifically the power transmission device 21B is disposed between an element (for example, an engine output shaft) connected to the engine 9 and an element (for example, a pump input shaft) of the hydraulic pump 82 in the speed change gear 11. The hydraulic pump 82 delivers hydraulic oil necessary for a travel of the wheel loader 1A to a hydraulic motor 83 in the speed change gear 11. When the wheel loader 1A is stopped, is gliding (inertia-traveling) or is performing power transmission through a transmission 11D, it is not necessary to deliver the hydraulic oil to the hydraulic motor 83. The power transmission device 21B is set to the cutoff state (release state) and the hydraulic pump 82 is mechanically separated from the engine 9. Thereby, the load of the engine 9 can be reduced. It should be noted that even if the hydraulic pump 10 or hydraulic pump 82 is a power generator, a similar effect can be obtained.

In FIG. 21, the power transmission device 21C is disposed between the hydraulic motor 83 in the speed change gear 11 and the output shafts 11B, 11C. Specifically the power transmission device 21C is disposed between an element (shaft) in the hydraulic motor 83 and an element (shaft) connected to the output shafts 11B, 11C. The hydraulic motor 83 converts hydraulic oil delivered from the hydraulic pump 82 in the speed change gear 11 to power (rotation) necessary for a travel of the wheel loader 1A. When the wheel loader 1A is stopped, is gliding (inertia-traveling) or is performing power transmission through the transmission 11D, it is not necessary to drive the front axle 12 and the rear axle 13 by the hydraulic motor 83. Therefore, the power transmission device 21C is set to the cutoff state (release state) and the connection between the hydraulic motor 83 and the output shafts 11B, 11C is released. Thereby, it is possible to reduce power to be consumed by the hydraulic motor 83. Since the loss of the power of the power transmission device 21C in the embodiment is small at the cutoff state (release state), it is also appropriate to use the power transmission device 21C in the embodiment to a portion performing a relative rotation at high speeds. It should be noted that in a case where the hydraulic pump 82 is used as a power generator, the hydraulic motor 83 may be replaced for an electric motor.

In FIG. 21, the speed change gear 11 is provided with the output shaft 11C on the rear side for driving the rear axle 13, and the output shaft 11B on the front side for driving the front axle 12. The power transmission device 21D is disposed between an element (shaft) connected to the engine 9 and the output shaft 11B on the front side. It is possible to perform the drive and the release of the front axle 12 by the connection (joint) and the cutoff (release) of the power transmission device 21D. On a condition that a road surface is stable and friction forces of the wheels 2A, 2B, 4A, 4B are sufficiently high, the power transmission device 21D is set to the cutoff state (release state). Thereby, by transmitting the power of the engine 9 to the rear axle 13 only, the loss caused by transmitting the power to the front axle 12 can be reduced. On the other hand, on a condition that a road surface is unstable and friction forces of the wheels 2A, 2B, 4A, 4B are low, the power transmission device 21D is set to the connection state (joint state). As a result, by transmitting the power of the engine 9 to both the front axle 12 and the rear axle 13, a traction force of the wheel loader 1A can be increased. The power transmission device 21D in the embodiment has large torque at the time of performing the synchronization by friction and even in a case where the torque is transmitted by mechanical meshing joint, the separation of the power transmission device 21D is made possible. Therefore, the joint and the release thereof are made possible even during the traveling. Therefore, it is also appropriate to use the power transmission device 21D to the switching of two-wheel drive and four-wheel drive. It should be noted that the power transmission device may be disposed between an element (shaft) connected to an engine and an output shaft on the rear side, or may be disposed between an element (shaft) connected to an engine and output shafts both on the front side and on the rear side.

In FIG. 22, the power transmitted from the engine 9 to the speed change gear 11 is distributed via a center differential 84 to the output shaft 11B on the front side and the output shaft 11C on the rear side. The center differential 84 is a differential mechanism, and includes a differential case, two side gears and one or more planet gears, for example. The center differential 84 is, in a case where the output shaft 11B on the front side is different in a rotational speed from the output shaft 11C on the rear side, a device for absorbing a difference in rotation. The power transmission device 21E is disposed in the center differential 84. For example, one of the first rotating shaft and the second rotating shaft is connected to a side gear linked to the output shaft 11B on the front side, and the other is connected to a side gear linked to the output shaft 11C on the rear side. The power transmission device 21E is engaged mechanically to the output shaft 11B on the front side and the output shaft 11C on the rear side. On a condition that the road surface is stable and the friction forces of the wheels 2A, 2B, 4A, 4B are sufficiently high, the power transmission device 21E is released to allow a difference in a rotational speed between the output shaft 11B on the front side and the output shaft 11C on the rear side, and the torque generated in the engine 9 is distributed to the front axle 12 and the rear axle 13 in a predetermined ratio. Thereby, the wheel loader 1B can travel stably. On the other hand, on a condition that the road surface is unstable and the friction forces of the wheels 2A, 2B, 4A, 4B are low, the power transmission device 21E is jointed to mechanically engage the output shaft 11B on the front side with the output shaft 11C on the rear side, making a rotational speed of the output shaft 11B on the front side equal to that of the output shaft 11C on the rear side. Thereby, even in a case where one output shaft 11B (or the output shaft 11C) of the output shaft 11B on the front side and the output shaft 11B (or 11C) on the rear side is idling, the transmission of the torque can be performed to the other output shaft 11C (or 11B). The power transmission device 21D in the embodiments is appropriate to be used to a lock application (switching between four wheel drive and four wheel drive differential lock) of the center differential 84.

In FIG. 22, the power transmitted from the engine 9 to the speed change gear 11 is distributed via the center differential 84 to the output shaft 11B on the front side and the output shaft 11C on the rear side. The power transmitted to the output shaft 11B on the front side is transmitted to the front axle, and is distributed to the left front wheel 2A and the right front wheel 2B by the front differential 85 installed in the front axle 12. The front differential 85 is a differential mechanism, and includes a differential case, two side gears and one or more planet gears, for example. The power transmission device 21F is disposed in the front differential 85. For example, one of the first rotating shaft and the second rotating shaft in the power transmission device 21F is connected to a side gear linked to the left front wheel 2A and the other is connected to a side gear linked to the right front wheel 2B. When the power transmission device 21F is jointed, a rotational speed of the left front wheel 2A can be equal to that of the right front wheel 2B. On a condition that the road surface is stable and the friction forces of the wheels 2A, 2B, 4A, 4B are sufficiently high, the power transmission device 21F is released to distribute torque to be transmitted to the left front wheel 2A and the right front wheel 2B and reduce tire slide caused by an inner wheel difference while turning, thus making it possible to reduce the loss of the power. On the other hand, on a condition that the road surface is unstable and the friction forces of the wheels 2A, 2B, 4A, 4B are low, the power transmission device 21F is jointed to make the rotational speed of the left front wheel 2A equal to that of the right front wheel 2B. Thereby, even in a case where one wheel 2A is idling, the torque can be transmitted to the other wheel 2B. Similarly, the power transmission device 21G is disposed to the rear differential 86 as well. The power transmission devices 21F, 21G in the embodiments are also appropriate to be used to a differential lock of the left, right wheels 2A, 2B, 4A, 4B.

In FIG. 22, the power transmission devices 21H, 22J are arranged between an element (shaft) linked to the engine 9 in the speed change gear 11 and transmission shafts 87, 88. Thereby, it is possible to switch the transmission shafts 87, 88 for performing the transmission of the power inside the speed change gear 11. That is, when one power transmission device 21H is jointed and the other power transmission device 21J is released, the power is transmitted to the one transmission shaft 87. When one power transmission device 21H is released and the other power transmission device 21J is jointed, the power is transmitted to the other transmission shaft 88. In addition, the power transmission devices 21K, 21L, 21M, 21N are arranged between shafts and gears. When the power transmission devices 21K, 21L, 21M, 21N are jointed, the transmission of the power is made possible between the gear and the shaft. The speed change gear 11 changes the power transmission paths by a combination of the joint and the release of the power transmission devices 21H, 21J, 21K, 21L, 21M, 21N, making it possible to change gear. The power transmission devices 21H, 21J, 21K, 21L, 21M, 21N in the embodiments are also appropriate to be used to applications (replacement of a synchronizer ring of a transmission, and a separate clutch between EG-DCT in a dual clutch transmission).

in FIG. 22, the power transmission device 21P is disposed between the engine 9 and the speed change gear 11 (more specifically, a torque converter 89 as a fluid coupling). When the wheel loader 1B is stopped or is slide-traveling (inertia-traveling), it is not necessary for the engine 9 to transmit power to the speed change gear 11. The speed change gear 11 has therein a portion in which even when the wheel loader 1B is stopped, a loss of power is caused by friction. Therefore, when the wheel loader 1B is stopped or is slide-traveling (inertia-traveling), the power transmission device 21P is released to separate the speed change gear 11 from the engine 9. Thereby, the loss of the power by the speed change gear 11 can be reduced. The power transmission device 21P in the embodiment is also appropriate to be used in a clutch between the engine 9 and the speed change gear 11 (torque converter 89).

In FIG. 22, the speed change gear 11 is provided with the torque converter 89 as the fluid coupling for gear change. The power of the engine 9 is transmitted to one impeller 89A installed inside the torque converter 89, which is converted to a liquid pressure (flow of oil). The other impeller 89B facing the one impeller 89A converts the liquid pressure to power. This power is transmitted to the power transmission devices 21H, 21J in the speed change gear 11. The torque converter 89 is provided with the power transmission device 21Q. The power transmission device 21Q performs joint and release between the one impeller 89A and the other impeller 89B. On a condition that load torque of the output shaft 11B on the front side or the output shaft 11C on the rear side is large, the loss of the power is made small by the gear change by the torque converter 89. Therefore, the power transmission device 21Q is released and the power transmission by liquid pressure is performed. On the other hand, on a condition that the load torque of the output shaft 11B on the front side or the output shaft 11C on the rear side is small, the loss of the power is increased by the gear change by the torque converter 89. Therefore, the one impeller 89A and the other impeller 89B are jointed by the power transmission device 21Q and the gear change by the torque converter 89 is stopped. Thereby, the loss by the torque converter 89 can be reduced. The power transmission device 21Q is also appropriate to be used in a lockup clutch of the torque converter 89.

In FIG. 22, the power transmission device 21R is disposed between the engine 9 and a cooling fan 81. The cooling fan 81 supplies cooling wind for cooling the engine 9. When a temperature of the engine 9 is low, the cooling by the cooling fan 81 is unnecessary. In this case, the power transmission device 21R is released and the cooling fan 81 is stopped. Thereby, the load of the engine 9 can be reduced. On the other hand, when the temperature of the engine 9 is high and the cooling by the cooling fan 81 is necessary, the power transmission device 21R is jointed and the cooling wind is supplied to the engine 9. The power transmission device 21R in the embodiment is also appropriate to be used in a clutch of a cooling fan for cooling a heat-transfer device of an engine, a radiator, an oil cooler or the like.

The embodiments are explained by taking a case where the power transmission devices 21, 21A, 21B, 21C, 21D, 21E, 21F, 21F, 21H, 21J, 21K, 21L, 21M, 21N, 21P, 21Q, 21R are mounted on the wheel loaders 1, 1A, 1B as an example. However, not limited thereto, the power transmission device according to the present invention may be mounted on a working vehicle (construction machine) other than a wheel loader of a hydraulic excavator, for example, a hydraulic crane, a dump truck, a fork lift or the like. In addition, the power transmission device according to the present invention, not limited to the working vehicle, may be widely applied as a power transmission device incorporated in various kinds of vehicles or various kinds of industrial machines, general machines, that is, as a power transmission device (clutch device) disposed in a portion where the switching of a connection state (joint state) and a cutoff state (release state) between a pair of rotating shafts is necessary.

In addition, the respective embodiments as described above are mentioned as examples, and without mentioning, a partial replacement or combination of components as shown in the different embodiments is made possible.

DESCRIPTION OF REFERENCE NUMERALS 1, 1A, 1B: Wheel loader (working vehicle)
21, 21A, 21B, 21C, 21D, 21E, 21F, 21G, 21H, 21J, 21K, 21L, 21M, 21N, 21P, 21Q, 21R: Power transmission device
22: First rotating shaft
32: Piston
37: Oil chamber
38, 62: First pawl portion
38A, 63A: First inclination part (First engagement part)
38A1: Side surface (Tip end-side engagement surface)
38B, 64B: Second inclination part (Second engagement part)
38B1: Side surface (Engagement surface)
39: Key ring
43: Second rotating shaft
47: Second pawl portion
47B: Second inclination part
47B1: Side surface (Engagement surface)
51: Synchronization ring
51A: Inner peripheral surface (Sliding surface)
52: Third pawl portion
53: Key grooves
54: First friction plate (Friction plate)
55: Second friction plate (Friction plate)
63: Inside first pawl portion (First engagement part)
64: Outside first pawl portion (Second engagement part)
75: First rotating shaft-side friction plate
76: Second rotating shaft-side friction plate

The invention claimed is:

1. A power transmission device comprising:
a first rotating shaft;
a piston that is disposed in the first rotating shaft in a state where an axial movement relative to the first rotating shaft is made possible and a circumferential movement relative to the first rotating shaft is blocked, and includes a first pawl portion;
an oil chamber that is disposed between the first rotating shaft and the piston and to which hydraulic oil is delivered to cause the piston to move in the axial direction of the first rotating shaft;
a second rotating shaft that is disposed to be coaxial with the first rotating shaft and to be capable of performing a relative rotation to the first rotating shaft, and includes a second pawl portion engageable with the first pawl portion; and
a synchronizer ring that is supported on the second rotating shaft to be coaxial with the second rotating shaft, and includes a sliding surface movable in the axial direction and in the circumferential direction relative to the second rotating shaft, and a third pawl portion engageable with the first pawl portion, characterized in that:
the first rotating shaft and the second rotating shaft are connected to be in a state where the transmission of the rotation is made possible by the first pawl portion of the piston and the second pawl portion of the second rotating shaft being engaged to each other based upon the delivery of the hydraulic oil to the oil chamber;
the first pawl portion of the piston is, when being engaged with the second pawl portion of the second rotating shaft based upon the delivery of the hydraulic oil to the oil chamber, engaged with the third pawl portion of the synchronizer ring prior to being engaged with the second pawl portion; and
engagement surfaces between the first pawl portion and the second pawl portion are formed as inclination surfaces so that a force is applied to the first pawl portion and the second pawl portion in a direction for axially moving away from each other when the rotation is transmitted between the first rotating shaft and the second rotating shaft.

2. The power transmission device according to claim 1 wherein a tip-end side engagement surface is disposed closer to a tip end side of the first pawl portion than an engagement surface of the first pawl portion engaging with the second pawl portion, the tip-end side engagement surface becoming engaged with the third pawl portion prior to the engagement of the first pawl portion and the second pawl portion.

3. The power transmission device according to claim 1 wherein the first pawl portion is provided with a first engagement part as a part to be engaged with the third pawl portion, and a second engagement part as a part to be engaged with the second pawl portion, the first engagement part and the second engagement part being formed in the piston as a single continuous pawl portion having the same inner diameter dimension.

4. The power transmission device according to claim 1 wherein the synchronizer is provided with a key groove, and the piston is provided with a key ring engaged with the key groove of the synchronizer ring prior to the engagement of the first pawl portion and the third pawl portion when the first pawl portion of the piston is engaged with the third pawl portion of the synchronizer ring.

5. The power transmission device according to claim 1 wherein the first pawl portion is provided with a first engagement part as a part engaging with the third pawl portion and a second engagement part as a part engaging with the second pawl portion, wherein the first engagement part and the second engagement part are formed in the piston as different pawl portions having different inner diameter dimensions.

6. The power transmission device according to claim 1 wherein a friction plate is arranged between the synchronizer ring and the second rotating shaft in a state where a circumferential movement relative to the synchronizer ring or the second rotating shaft is blocked, the friction plate being axially held between the synchronizer ring and the second rotating shaft.

7. A power transmission device comprising:

a first rotating shaft;

a piston that is disposed in the first rotating shaft in a state where an axial movement relative to the first rotating shaft is made possible and a circumferential movement relative to the first rotating shaft is blocked, and includes a first pawl portion;

an oil chamber that is disposed between the first rotating shaft and the piston and to which hydraulic oil is delivered to cause the piston to move in the axial direction of the first rotating shaft;

a first rotating shaft-side friction plate that is supported in the piston in a state of being coaxial with the piston and relative rotation to the piston being blocked;

a second rotating shaft that is disposed to be coaxial with the first rotating shaft and to be capable of performing a relative rotation to the first rotating shaft, and includes a second pawl portion engageable to the first pawl portion; and a second rotating shaft-side friction plate that is supported in the second rotating shaft in a state of being coaxial with the second rotating shaft and relative rotation to the second rotating shaft being blocked, characterized in that:

the first rotating shaft and the second rotating shaft are connected to be in a state where the transmission of the rotation is made possible by the first pawl portion of the piston and the second pawl portion of the second rotating shaft being engaged to each other based upon the delivery of the hydraulic oil into the oil chamber;

the first rotating shaft-side friction plate makes, when the first pawl portion of the piston is engaged with the second pawl portion of the second rotating shaft based upon the delivery of the hydraulic oil to the oil chamber, frictional contact with the second rotating shaft-side friction plate prior to the engagement of the first pawl portion and the second pawl portion; and engagement surfaces between the first pawl portion and the second pawl portion are formed as inclination surfaces so that a force is applied to the first pawl portion and the second pawl portion in a direction of axially moving away from each other when the rotation is transmitted between the first rotating shaft and the second rotating shaft.

* * * * *